(12) United States Patent
Horn et al.

(10) Patent No.: US 11,757,516 B2
(45) Date of Patent: Sep. 12, 2023

(54) BEAM MANAGEMENT PROCEDURE FOR OAM IN MMW AND HIGHER BANDS

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/351,526

(22) Filed: Jun. 18, 2021

(65) Prior Publication Data
US 2022/0407580 A1    Dec. 22, 2022

(51) Int. Cl.
*H04B 7/06* (2006.01)
*H04B 17/318* (2015.01)

(52) U.S. Cl.
CPC ......... *H04B 7/0682* (2013.01); *H04B 17/318* (2015.01)

(58) Field of Classification Search
CPC .. H04B 7/0617; H04B 7/0417; H04B 17/318; H04B 7/0682
USPC .................................................. 375/299, 267
See application file for complete search history.

(56) References Cited

U.S. PATENT DOCUMENTS

| | | |
|---|---|---|
| 8,432,884 B1 | 4/2013 | Ashrafi |
| 8,743,984 B2 | 6/2014 | Djordjevic et al. |
| 9,031,151 B1 * | 5/2015 | Harris ................. H04B 7/0617 375/267 |
| 9,077,577 B1 | 7/2015 | Ashrafi et al. |
| 9,379,926 B2 | 6/2016 | Berretta et al. |
| 9,838,128 B1 * | 12/2017 | Rusch ..................... G02B 6/34 |
| 10,371,508 B1 * | 8/2019 | Ulander ............... H04B 10/112 |
| 11,088,752 B1 | 8/2021 | Klemes et al. |
| 11,139,867 B2 | 10/2021 | Sasaki et al. |
| 11,170,318 B2 | 11/2021 | Ashrafi |
| 11,202,211 B2 | 12/2021 | Sasaki et al. |
| 11,202,335 B2 | 12/2021 | Ashrafi |
| 11,228,363 B2 | 1/2022 | Sasaki et al. |

(Continued)

FOREIGN PATENT DOCUMENTS

| | | | |
|---|---|---|---|
| CN | 110266354 A | 9/2019 | |
| CN | 112702096 A * | 4/2021 | ............... G01S 3/46 |

(Continued)

OTHER PUBLICATIONS

Co-pending U.S. Appl. No. 17/351,819, inventor Horn; Idan, filed Jun. 18, 2021.

(Continued)

*Primary Examiner* — Emmanuel Bayard
(74) *Attorney, Agent, or Firm* — Procopio, Cory, Hargreaves & Savitch

(57) ABSTRACT

A configuration for beam management procedure using OAM beams. The apparatus transmits, to a receiver, a positive phase order OAM transmission on at least one beam. The apparatus transmits, to the receiver, a negative phase order OAM transmission on the at least one beam. The apparatus receives, from the receiver, a report indicating a relative phase difference between the positive phase order OAM transmission and the negative phase order OAM transmission.

30 Claims, 17 Drawing Sheets

(56) References Cited

U.S. PATENT DOCUMENTS

| | | | |
|---|---|---|---|
| 11,283,522 B2 | 3/2022 | Ashrafi | |
| 11,342,976 B1 | 5/2022 | Dallal et al. | |
| 11,368,198 B2 | 6/2022 | Hirabe | |
| 2003/0137645 A1 | 7/2003 | Fluckiger | |
| 2005/0239426 A1 | 10/2005 | Berretta et al. | |
| 2009/0227252 A1 | 9/2009 | Fenech et al. | |
| 2010/0073260 A1* | 3/2010 | Fujita | H01Q 25/008 343/700 R |
| 2012/0295538 A1 | 11/2012 | Arcidiacono et al. | |
| 2012/0307933 A1 | 12/2012 | Djordjevic et al. | |
| 2013/0027034 A1 | 1/2013 | Elgort et al. | |
| 2013/0235885 A1 | 9/2013 | Chen et al. | |
| 2013/0285853 A1 | 10/2013 | Lee | |
| 2014/0016181 A1 | 1/2014 | Dal Negro | |
| 2014/0199066 A1 | 7/2014 | Martelli et al. | |
| 2014/0205283 A1 | 7/2014 | Djordjevic et al. | |
| 2014/0348423 A1 | 11/2014 | Ishiga | |
| 2015/0030280 A1 | 1/2015 | Alu et al. | |
| 2015/0055961 A1 | 2/2015 | Meyers et al. | |
| 2015/0084636 A1 | 3/2015 | Popescu | |
| 2015/0146815 A1 | 5/2015 | Berretta et al. | |
| 2015/0194735 A1 | 7/2015 | Graceffo | |
| 2015/0304152 A1 | 10/2015 | Chen et al. | |
| 2015/0357710 A1* | 12/2015 | Li | H01Q 21/065 342/174 |
| 2016/0043794 A1 | 2/2016 | Ashrafi et al. | |
| 2016/0044647 A1 | 2/2016 | Ashrafi et al. | |
| 2016/0254897 A1 | 9/2016 | Berretta et al. | |
| 2016/0292472 A1 | 10/2016 | Tamburini et al. | |
| 2017/0026095 A1 | 1/2017 | Ashrafi et al. | |
| 2017/0126460 A1 | 5/2017 | Dutronc et al. | |
| 2017/0181183 A1* | 6/2017 | Sung | H04B 7/0695 |
| 2017/0187442 A1 | 6/2017 | Luddy et al. | |
| 2017/0331532 A1 | 11/2017 | Le-Ngoc | |
| 2017/0353265 A1 | 12/2017 | Mansouri Rad et al. | |
| 2018/0026817 A1 | 1/2018 | Graceffo et al. | |
| 2018/0234285 A1* | 8/2018 | Djordjevic | H04L 27/345 |
| 2019/0020434 A1 | 1/2019 | Adachi et al. | |
| 2019/0028165 A1* | 1/2019 | Adachi | H01Q 3/36 |
| 2019/0149251 A1 | 5/2019 | Zenkyu | |
| 2019/0165837 A1* | 5/2019 | Son | H04B 17/12 |
| 2019/0165849 A1 | 5/2019 | Ashrafi et al. | |
| 2019/0198999 A1 | 6/2019 | Ashrafi | |
| 2019/0334609 A1 | 10/2019 | Alavi et al. | |
| 2020/0127709 A1 | 4/2020 | Klemes | |
| 2020/0127729 A1 | 4/2020 | Klemes | |
| 2020/0228195 A1 | 7/2020 | Sasaki et al. | |
| 2020/0296599 A1 | 9/2020 | Sasaki et al. | |
| 2020/0313307 A1* | 10/2020 | Lee | H04B 7/0469 |
| 2020/0388935 A1 | 12/2020 | Lee et al. | |
| 2021/0028965 A1 | 1/2021 | Dutronc et al. | |
| 2021/0058118 A1* | 2/2021 | Sasaki | H04B 7/0848 |
| 2021/0211168 A1 | 7/2021 | Sasaki et al. | |
| 2021/0288699 A1* | 9/2021 | Hirabe | H04B 17/309 |
| 2021/0320707 A1 | 10/2021 | Kamiya | |
| 2021/0399766 A1 | 12/2021 | Zenkyu et al. | |
| 2022/0029301 A1 | 1/2022 | Dallal et al. | |
| 2022/0029697 A1 | 1/2022 | Bakr et al. | |
| 2022/0078780 A1 | 3/2022 | Choi et al. | |
| 2022/0123803 A1 | 4/2022 | Rimalapudi et al. | |

FOREIGN PATENT DOCUMENTS

| | | |
|---|---|---|
| EP | 3567783 A1 | 11/2019 |
| JP | 2018037744 A | 3/2018 |
| JP | 2019062297 A | 4/2019 |
| WO | 2021077921 A1 | 4/2021 |
| WO | WO-2021077921 A1 * | 4/2021 |
| WO | 2021104518 A1 | 6/2021 |

OTHER PUBLICATIONS

Co-pending U.S. Appl. No. 17/351,883, inventor Landis; Shay, filed Jun. 18, 2021.

Co-pending U.S. Appl. No. 17/352,047, inventor Horn; Idan, filed Jun. 18, 2021.

International Search Report and Written Opinion—PCT/US2022/030378—ISA/EPO—dated Aug. 24, 2022.

International Search Report and Written Opinion—PCT/US2022/030214—ISA/EPO—dated Sep. 13, 2022.

International Search Report and Written Opinion—PCT/US2022/030352—ISA/EPO—dated Aug. 26, 2022.

Partial International Search Report—PCT/US2022/030214—ISA/EPO—dated Aug. 22, 2022.

Rui C., et al., "Spectral and Energy Efficiency of Line-of-Sight OAM-MIMO Communication Systems", China Communications, China Institute of Communications, Piscataway, NJ, USA, vol. 17, No. 9, Sep. 1, 2020 (Sep. 1, 2020), pp. 119-127, XP011811373, ISSN: 1673-5447, DOI: 10.23919/JCC.2020.09.010 [retrieved on Sep. 25, 2020] p. 121, right-hand column, line 7-p. 125, right-hand column, line 25, 1,2 figures.

Tamburini F., et al., "Encoding Many Channels on the Same Frequency Through Radio Vorticity: First Experimental Test", New Journal of Physics, IOP Institute of Physics, 2012, 18 Pages.

Vasnetsov M.V., et al., "Analysis of Orbital Angular Momentum of a Misaligned Optical Beam", New Journal of Physics, vol. 7, No. 46, 2005, pp. 1-17.

Wikipedia: "Orbital Angular Momentum of Light", Last Edited on May 20, 2021, pp. 1-9.

Yang Q., et al., "Capacity Analysis of OAM Millimeter Wave System in the Off-axis Misalignment Case", 2019 IEEE International Conference on Consumer Electronics—Taiwan (ICCE-TW), IEEE, May 20, 2019, pp. 1-2, XP033712642, the whole document.

* cited by examiner

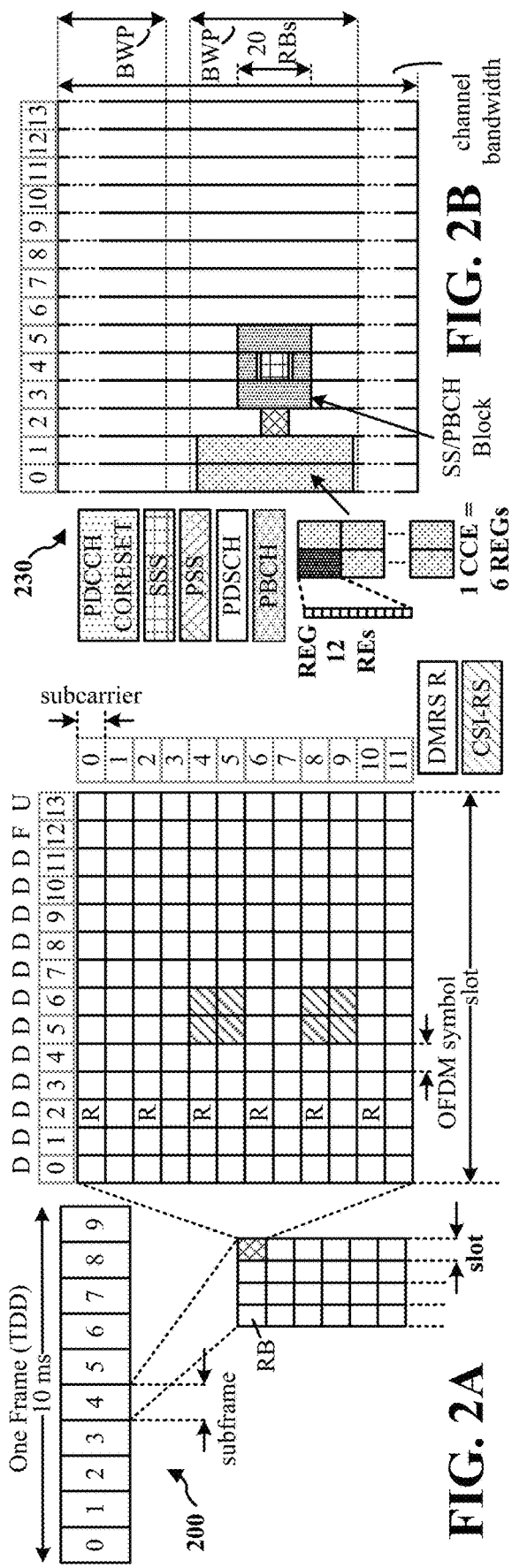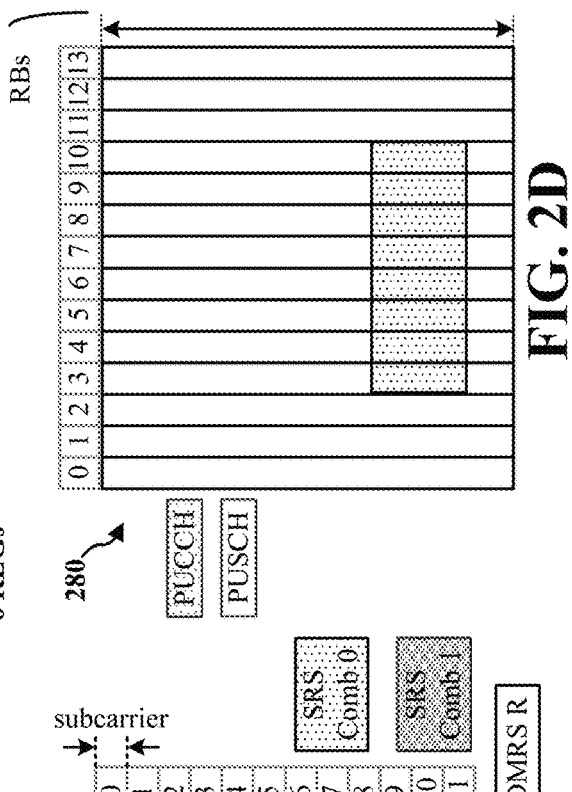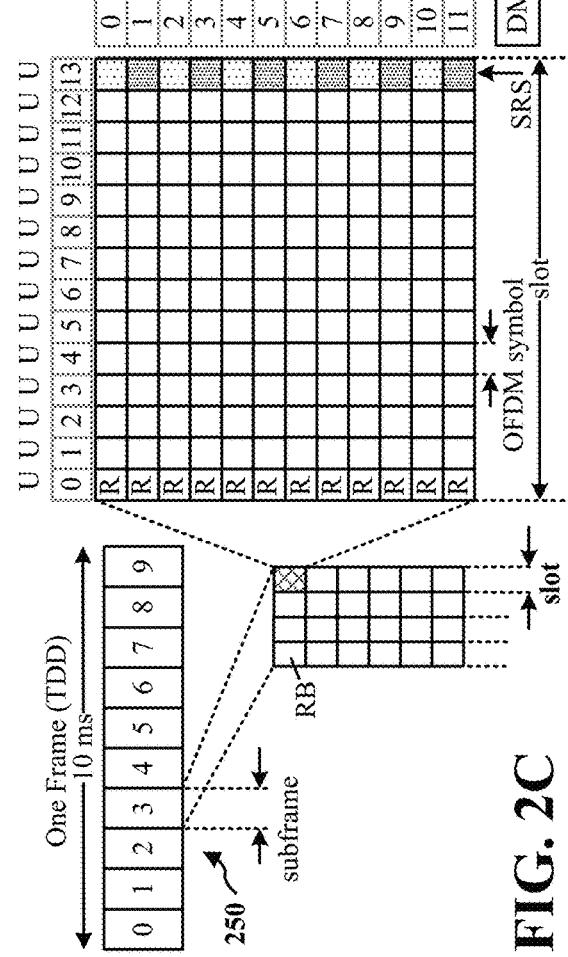
FIG. 2A  FIG. 2B  FIG. 2C  FIG. 2D

BEAM MANAGEMENT PROCEDURE FOR OAM IN MMW AND HIGHER BANDS

TECHNICAL FIELD

The present disclosure relates generally to communication systems, and more particularly, to a configuration for beam management procedures for orbital angular momentum (OAM) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a transmitter. The device may be a processor and/or a modem at a transmitter or the transmitter itself. The apparatus transmits, to a receiver, a positive phase order orbital angular momentum (OAM) transmission on at least one beam. The apparatus transmits, to the receiver, a negative phase order OAM transmission on the at least one beam. The apparatus receives, from the receiver, a report indicating a relative phase difference between the positive phase order OAM transmission and the negative phase order OAM transmission.

In an aspect of the disclosure, a method, a computer-readable medium, and an apparatus are provided. The apparatus may be a device at a receiver. The device may be a processor and/or a modem at a receiver or the receiver itself. The apparatus receives, from a transmitter, a positive phase order orbital angular momentum (OAM) transmission on at least one beam. The apparatus receives, from the transmitter, a negative phase order OAM transmission on the at least one beam. The apparatus transmits, to the transmitter, a report indicating a relative phase difference between the positive phase order OAM transmission and the negative phase order OAM transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
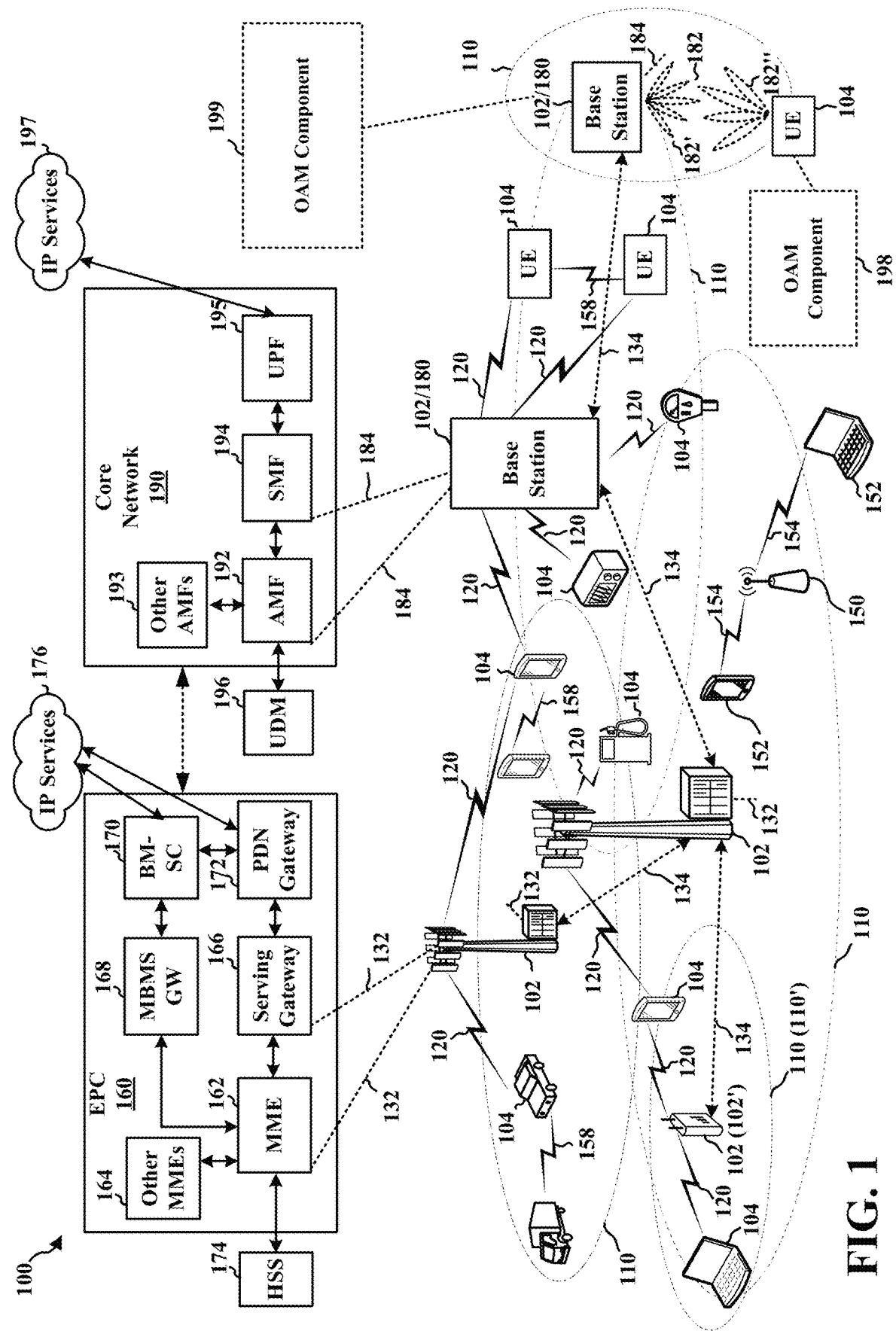
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the transmitter 180 (e.g., base station) may be configured to configure a receiver with a beam management procedure with small overhead using OAM. For example, the transmitter 180 (e.g., base station) may comprise an OAM component 199 configured to configure a receiver with a beam management procedure with small overhead using OAM.

Referring again to FIG. 1, in certain aspects, the receiver 104 (e.g., UE) may be configured with a beam management procedure with small overhead using OAM. For example, the receiver 104 (e.g., UE) may comprise an OAM component 198 configured to be configured with a beam management procedure with small overhead using OAM.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-

OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
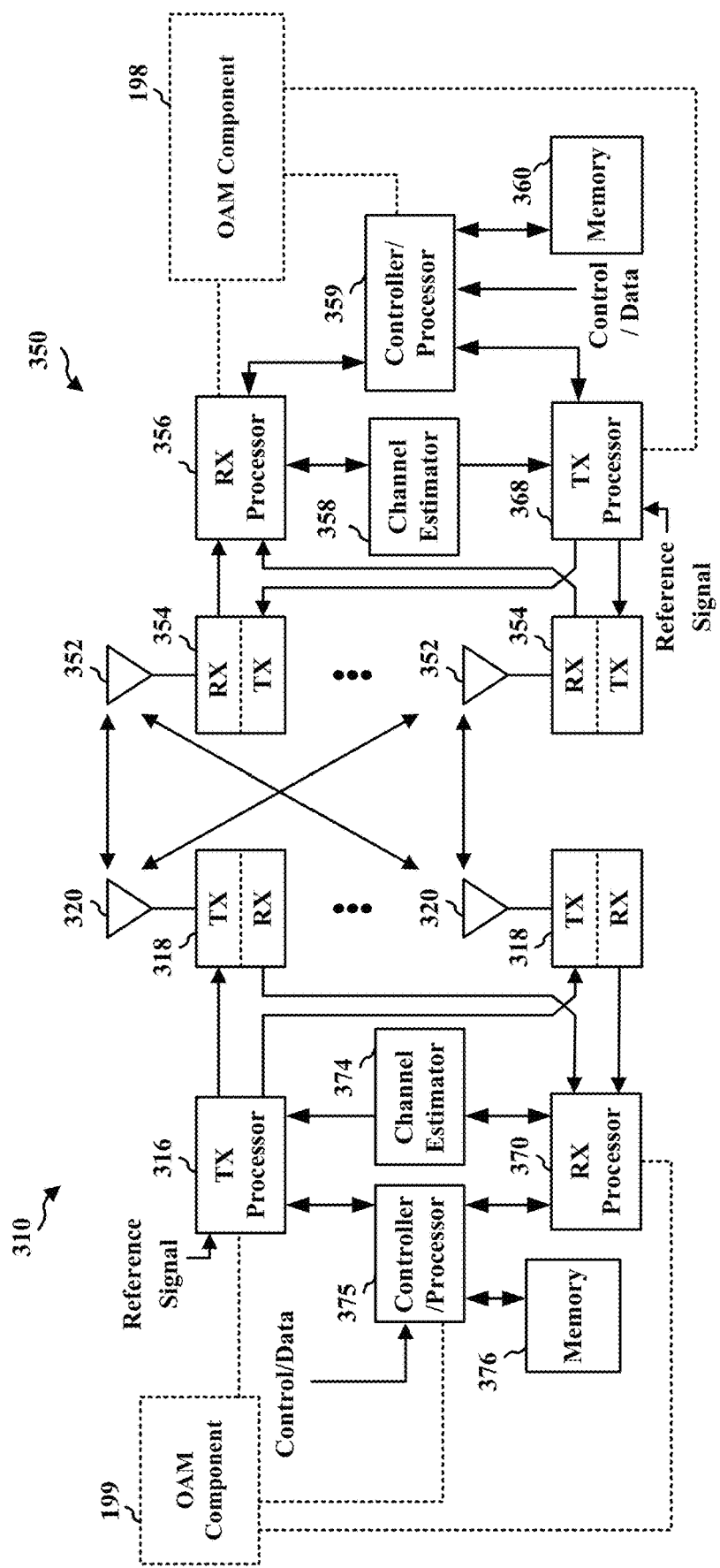
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Electromagnetic waves may be emitted or transmitted to carry an orbital angular momentum (OAM) associated with a helical structure of a wavefront around an axis of a beam. As an example, the OAM of a light beam may correspond to a component of angular momentum of the light beam that is based on the field spatial distribution rather than polarization. In addition to light, a radio frequency signal may have an OAM helical structure. The RF signal may be a signal for wireless communication and comprise a beamformed signal that may be referred to herein as a "beam." The helical structure of the beam may be characterized by a wavefront that is shaped as a helix with a vortex in the center (e.g., at the beam axis). The beams may be characterized by an integer number of times that the phase of the wavefront rotates around the beam axis. The spatial phase dependence factor of an OAM beam may be characterized by Equation 1 below.

$$\Phi(\theta)=e^{im\theta}$$ Equation 1:

In Equation 1, the parameter "θ" represents the angle measure around the axis (e.g., the beam axis). The parameter "m" represents a topological charge and corresponds to a number of rotations that a helical structure (sometimes referred to as a "helical beam" or "helical wavefront") exhibits in a path circling once around the center of a receiver. The topological charge may comprise an integer and may be positive or negative depending on the direction in which the helical structure twists. The higher the value of the topological charge m, the faster the phase of the wavefront rotates around a beam axis. As an example, for OAM for light, the wavefront rotates around a beam axis. For an example with a radio frequency OAM, the beam axis may refer to an axis of the RF signal beam. The parameter "mθ" represents the phase difference acquired over the course of a cycle for the topological charge m.

Figure 4:
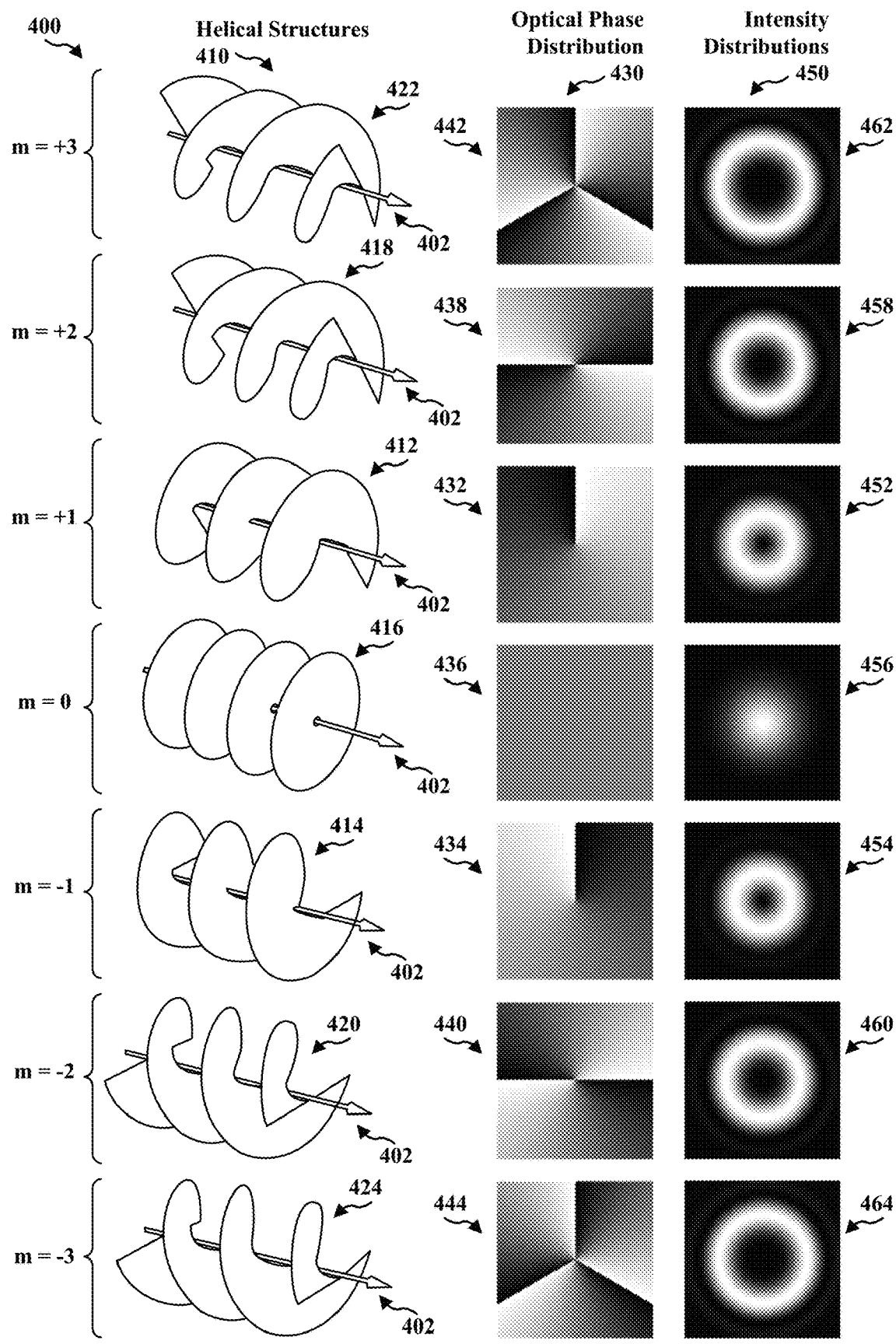
FIG. 4 is a diagram depicting example helical structures and corresponding optical phase distributions and intensity distributions, in accordance with various aspects of the present disclosure.

FIG. 4 is a diagram 400 depicting examples of different helical structures 410 and corresponding optical phase distributions 430 and intensity distributions 450. Each of the helical structures 410 depicts a shape of the helical structure and may be characterized by the topological charge m. Each of the optical phase distributions 430 depict the corresponding optical phase distributions in a beam cross-section. Each of the intensity distributions 450 depict the light intensity distribution in a beam cross-section. In some examples, the intensity distributions 450 may be referred to as a "vortex."

For example, a first helical structure 412 ("m=+1") is characterized by one rotation of phase around a beam axis 402, and in a first direction. A first optical phase distribution 432 corresponding to the first helical structure 412 indicates one cycle. That is, if a receiving element is placed perpendicular to the beam axis 402, the phase measured at the receiving element indicates that the first helical structure 412 is shaped as a single helical surface and completes one cycle (e.g. 0 to 2π) of phase rotation around the beam axis 402. A first intensity distribution 452 corresponding to the first helical structure 412 indicates a luminous intensity measured at the receiving element for the first helical structure 412. Because of the twisting nature of the first helical structure 412, the lights waves at the beam axis 402 cancel each other. When projected onto a flat surface (e.g., the receiving element placed perpendicular to the beam axis 402), the intensity distribution (or "optical vortex") appears as a ring of light with a dark vortex core in the center. The dark cortex core (also referred to as a "singularity") corresponds to a region of low intensity.

The example of FIG. 4 includes a second helical structure 414 ("m=−1") that is also characterized by one rotation of phase around the beam axis 402. As shown in FIG. 4, the second helical structure 414 is based on an opposite rotational direction of the first helical structure 412. For example, the first optical phase distribution 432 indicates a clockwise rotation of the first helical structure 412 and a second optical phase distribution 434 corresponding to the second helical structure 414 indicates a counter-clockwise rotation of the second helical structure 414. A second intensity distribution 454 corresponding to the second helical structure 414 indicates a similar intensity distribution as the first intensity distribution 452.

The example of FIG. 4 also includes a third helical structure 416 ("m=0") that is characterized by zero rotations around the beam axis 402. That is, the third helical structure 416 indicates that the corresponding beam is not helical-shaped. As a result, the wavefronts associated with the third helical structure 416 are depicted as multiple disconnected surfaces, such as a sequence of parallel planes. As there is no "twist" or phase rotation associated with the third helical structure 416, a third optical phase distribution 436 corresponding to the third helical structure 416 indicates a same phase. Additionally, as there is not twist in the phase rotation associated with the third helical structure 416, a corresponding third intensity distribution 456 does not depict a singularity at the center since the light waves associated with the third helical structure 416 do not cancel each other out.

The example of FIG. 4 also includes a fourth helical structure 418 ("m=+2") and a fifth helical structure 420 ("m=−2"). The fourth helical structure 418 and the fifth helical structure 420 are characterized by two rotations around the beam axis 402. As shown in FIG. 4, the fifth helical structure 420 is based on an opposite rotational direction of the fourth helical structure 418. A fourth optical phase distribution 438 corresponding to the fourth helical structure 418 indicates that the fourth helical structure 418 is shaped as a double helical surface and completes two cycles (e.g., two completions of 0 to 2π or 4π) of phase rotation around the beam axis 402. Additionally, the singularity at a fourth intensity distribution 458 corresponding to the fourth helical structure 418 is larger than, for example, the first intensity distribution 452 as the additional "twists" associated with the fourth helical structure 418 provide additional light beams to cancel each other out, resulting in an increased low intensity region.

A fifth optical phase distribution 440 corresponding to the fifth helical structure 420 indicates that the fifth helical structure 420 is based on an opposite rotational direction of the fourth helical structure 418. For example, the fourth optical phase distribution 438 indicates two clockwise rotations of the fourth helical structure 418 and the fifth optical phase distribution 440 indicates two counter-clockwise rotations of phase of the fifth helical structure 420. A fifth intensity distribution 460 corresponding to the fifth helical structure 420 indicates a similar intensity distribution as the fourth intensity distribution 458.

The example of FIG. 4 also includes a sixth helical structure 422 ("m=+3") and a seventh helical structure 424 ("m=−3"). The sixth helical structure 422 and the seventh helical structure 424 are characterized by three rotations around the beam axis 402. As shown in FIG. 4, the seventh helical structure 424 is based on an opposite rotational direction of the sixth helical structure 422. A sixth optical phase distribution 442 corresponding to the sixth helical structure 422 indicates that the sixth helical structure 422 is shaped as a triple helical surface and completes three cycles (e.g., three completions of 0 to 2π or 6π) of phase rotation around the beam axis 402. Additionally, the singularity at a sixth intensity distribution 462 corresponding to the sixth helical structure 422 is larger than, for example, the first intensity distribution 452 as the additional "twists" associated with the sixth helical structure 442 provide additional light beams to cancel each other out, resulting in an increased low intensity region.

A seventh optical phase distribution 444 corresponding to the seventh helical structure 424 indicates that the seventh helical structure 424 is based on an opposite rotational direction of the sixth helical structure 422. For example, the sixth optical phase distribution 442 indicates three clockwise rotations of the sixth helical structure 422 and the seventh optical phase distribution 444 indicates three counter-clockwise rotations of phase of the seventh helical structure 424. A seventh intensity distribution 464 corresponding to the seventh helical structure 424 indicates a similar intensity distribution as the sixth intensity distribution 462.

OAM beams may be useful as a transmission scheme for line-of-sight transmissions in a wireless communication network, such as the access network 100 of FIG. 1. For example, OAM transmissions (also referred to as "OAM waveforms") may be useful for higher bands, such as the millimeter wave frequency band or higher frequency bands (e.g., FR2, FR4, etc.). When employing MIMO technology, each topological charge of an OAM transmission may correspond to an orthogonal carrier.

Figure 5:
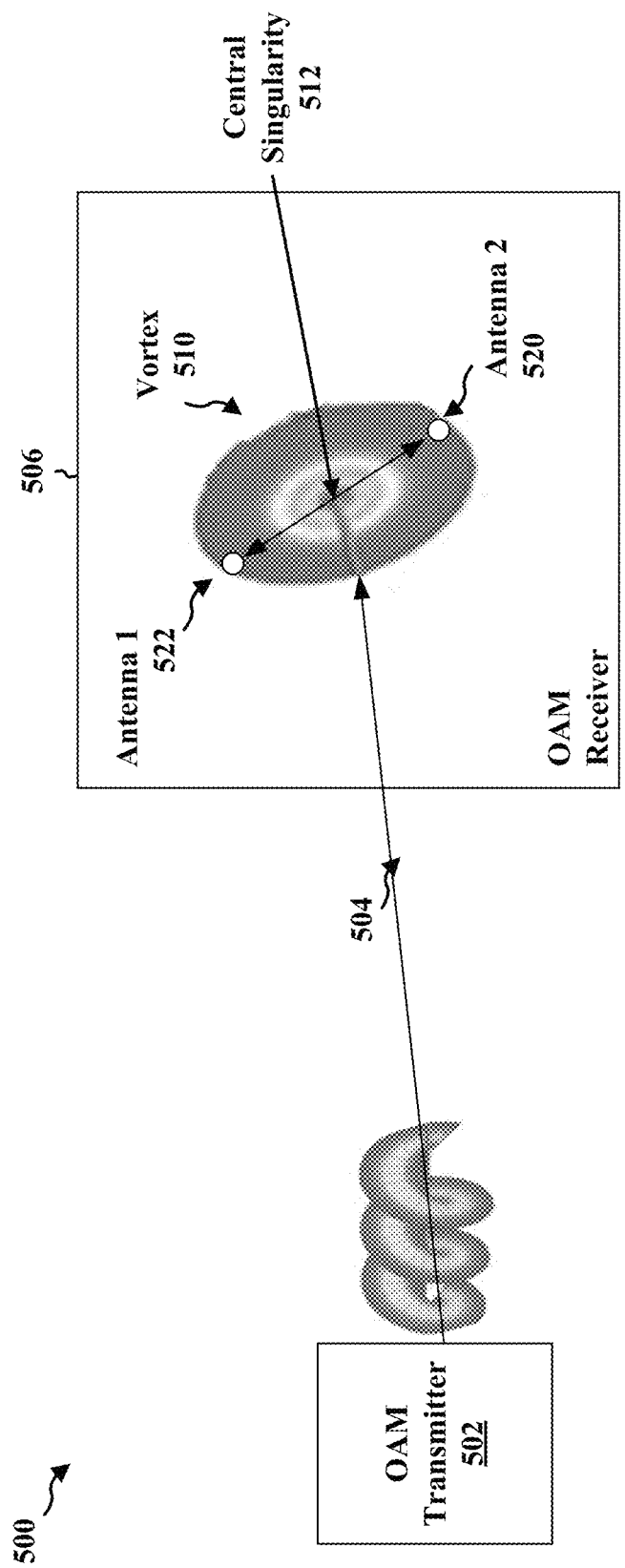
FIG. 5 is a diagram depicting an example of an OAM transmission including a transmitter, in accordance with various aspects of the present disclosure.

A helical structure for use in wireless communication may be generated using various techniques. As an example, FIG. 5 depicts an example 500 of an OAM transmission transmitted by an OAM transmitter 502 and received by an OAM receiver 506. In some examples, the OAM transmitter 502 may include a component that is configured to generate a helical structure with a particular topological charge. In some examples, an optical element, such as a lens, may be employed to generate the desired helical structure. For example, a lens may be positioned and configured so that a beam output by the OAM transmitter 502 is shaped with a particular topological charge (e.g., m=+1, m=−1, etc.). In other examples, a lens may not be used.

An antenna array at a receiver may receive the OAM transmission output by the OAM transmitter 502. The OAM transmission may comprise a beam axis 504, e.g., an axis of a beamformed signal. FIG. 5 depicts a vortex 510 that may correspond to the intensity distribution of the OAM transmission. The vortex 510 includes a singularity 512 associated with a low intensity region.

The OAM transmission may be received at multiple antenna elements at the OAM receiver 506, such as a first antenna element 520 ("Antenna 1") and a second antennal element 522 ("Antenna 2"). The OAM receiver 506 may compare the detected phases around the singularity 512 to determine the topological charge associated with the OAM transmission. For example, the OAM receiver 506 may measure the phase at the first antenna element 520 and the phase at the second antenna element 522 relative to the singularity 512 to determine the topological charge associated with the OAM transmission. In some examples, the number of antenna elements at which measurements are made may be based on the topological charge. For example, the receiver may use a number of antenna elements based on Equation 2 below.

$$\text{Number of elements} \geq 2|m|+1 \quad \text{Equation 2:}$$

In Equation 2, the number of elements is determined as at least one more than twice the absolute value of the topological charge. For example, to detect a topological charge of m=+1 or m=−1, the receiver may employ at least three antenna elements to measure the phase. However, in some examples, the number of elements may depend on the configuration of the elements at the OAM receiver 506.

Figure 6:
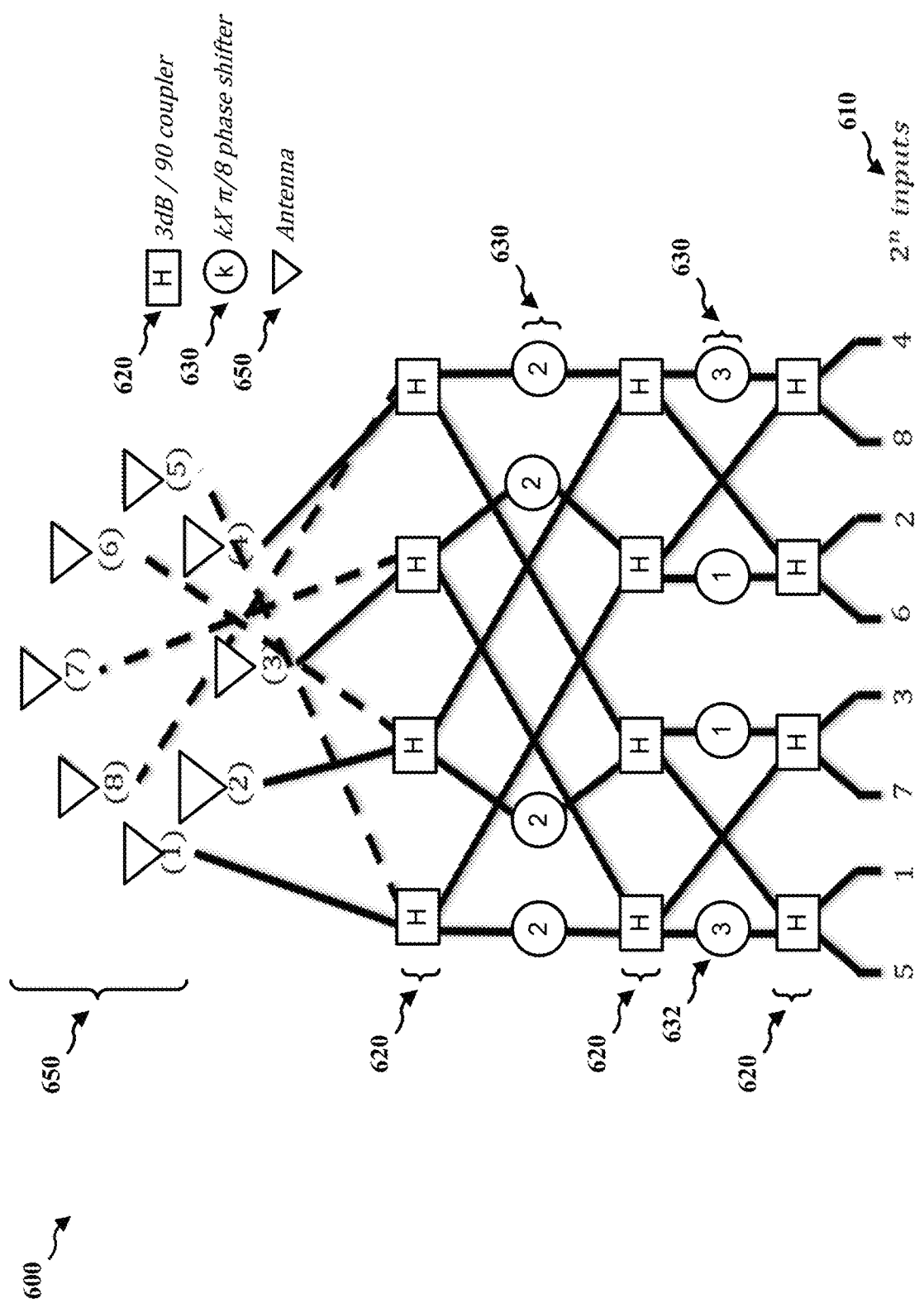
FIG. 6 is a diagram depicting an example 8×8 Butler Matrix for a unified circular array, in accordance with various aspects of the present disclosure.

FIG. 6 depicts an example 8×8 Butler Matrix 600 for a uniform circular array, as presented herein. The Butler Matrix 600 includes eight inputs 610 that are passed through a combination of twelve hybrid couplers 620 and eight fixed phase shifters 630 to generate eight outputs 640. The outputs 640 are received by respective antenna elements 650 to generate eight example beams. Each of the respective hybrid couplers 620 generate a 90 degree offset. Each of the respective fixed phase shifters 630 create an integer multiplication of an index k of a π/8 phase shift. For example, an example fixed phase shifter 632 creates an integer multiplication of an index k=3 of a π/8 phase shift (or a 3*π/8 phase shift). As a result, the eight example beams generated by the Butler Matrix 600 are orthogonally spaced beams. The antenna elements 650 of the Butler Matrix 600 are arranged in a uniform circular array.

Figure 7:
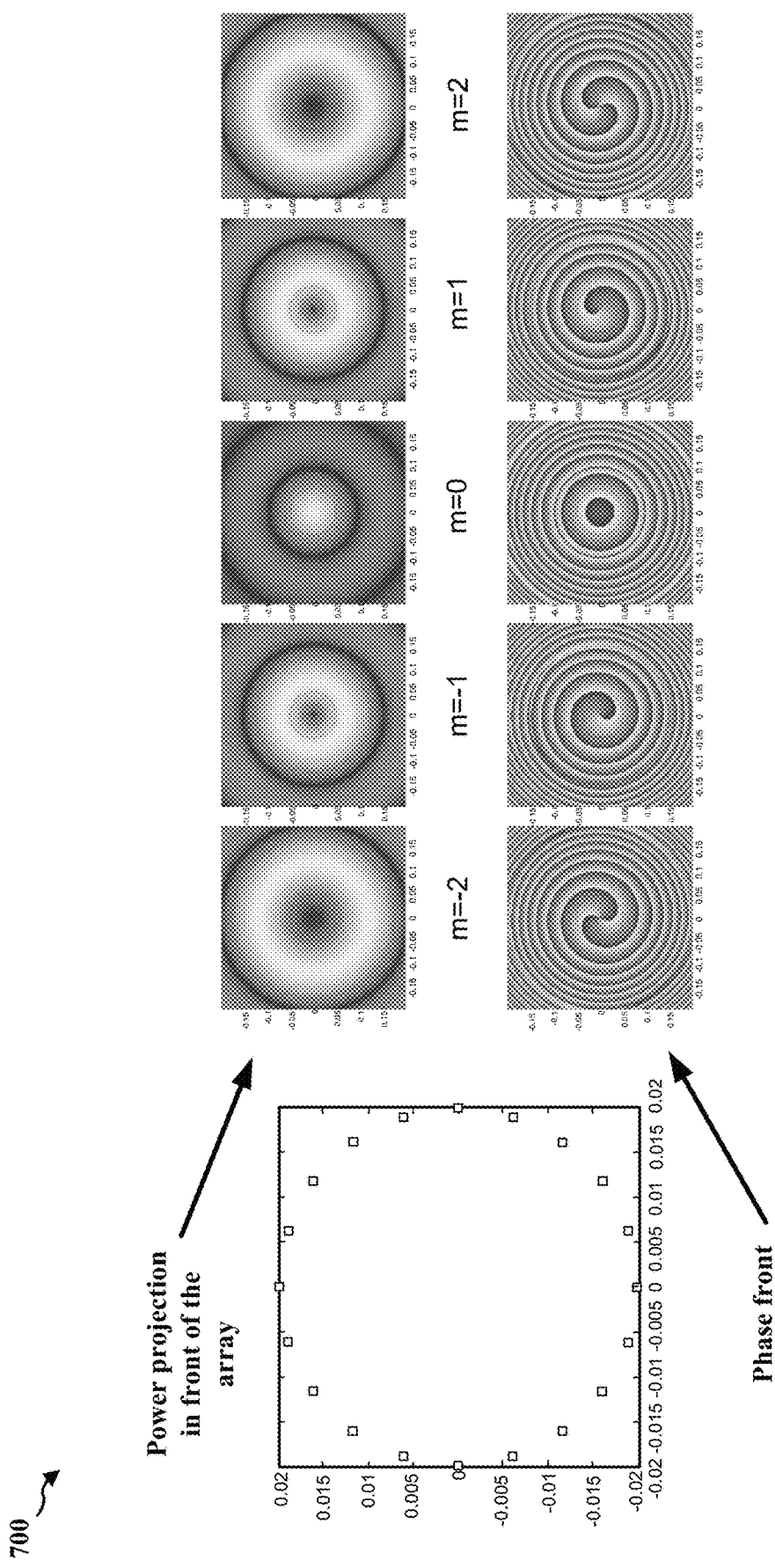
FIG. 7 is a diagram depicting an example of a power projection and phase of the OAM transmission.
Figure 8:
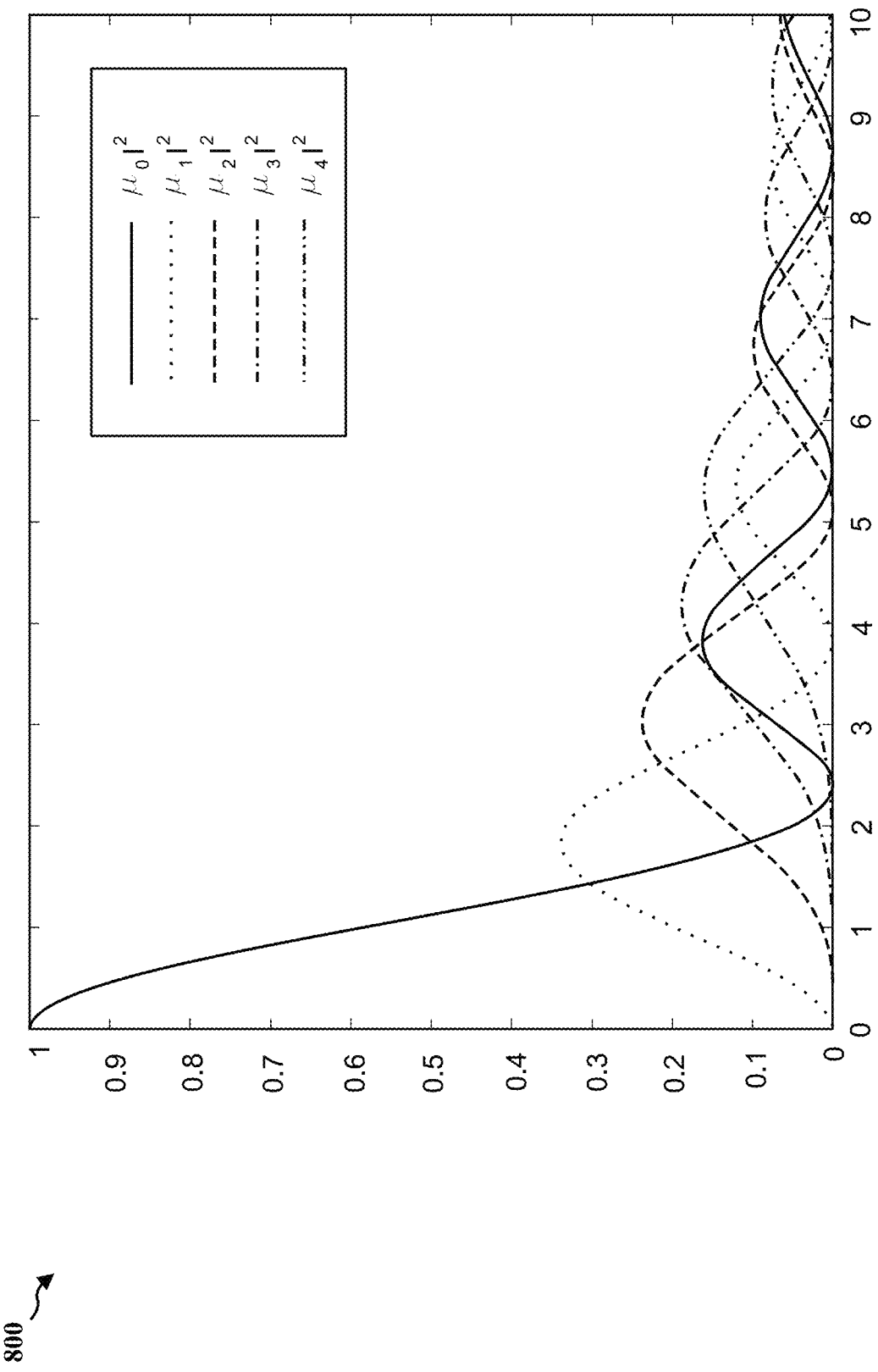
FIG. 8 is a diagram depicting a radiation pattern intensity of the OAM transmission.
Figure 9:
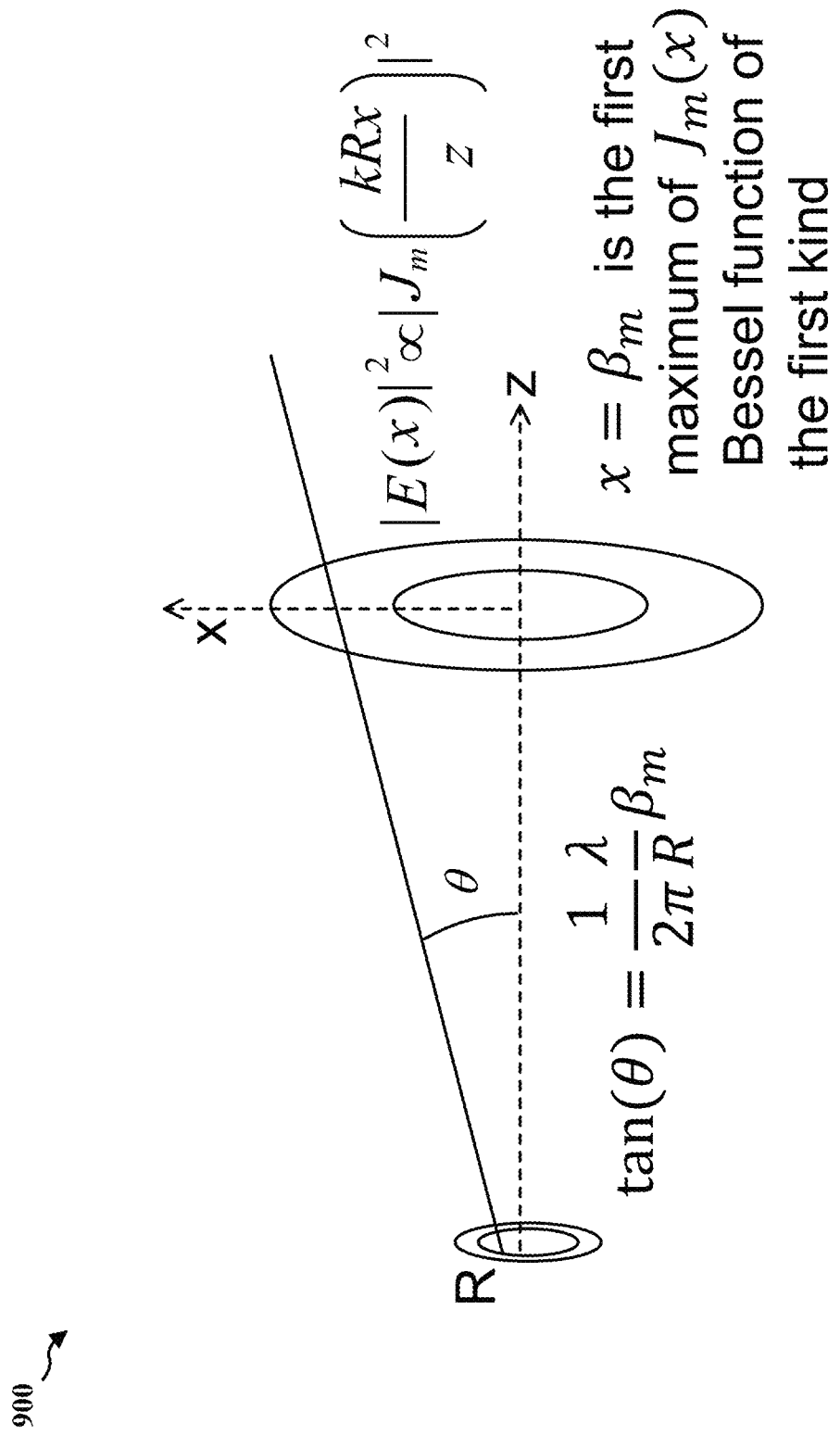
FIG. 9 is a diagram depicting the radiation pattern intensity of the OAM transmission.

FIG. 7 is a diagram 700 of the power projection and phase of an OAM transmission. As shown in FIG. 7, an OAM transmission may comprise a radiating ring with a helical phase for a particular OAM order m may generate a conical beam, as shown for example in the diagram 900 of FIG. 9. The divergence angle may depend on m (e.g., beam order), radiating ring diameter, and wavelength. The radiation pattern intensity may follow a Bessel function of the first kind, as shown in the diagram 800 of FIG. 8. The energy of $J_m(x)$ for different m values do not substantially overlap.

Aspects provided herein provide a configuration for a dedicated beam management procedure for OAM beams that take advantage of the efficient OAM space coverage. The framework of the beam management may minimize or limit overhead while using OAM waveform. At least one advantage of the disclosure is that coverage and throughput may be improved for transmitter (e.g., base station) to receiver (e.g., UE) communication using OAM waveform. At least another advantage of the disclosure is that the beam management procedure may reduce or minimize the number of scans.

Figure 11:
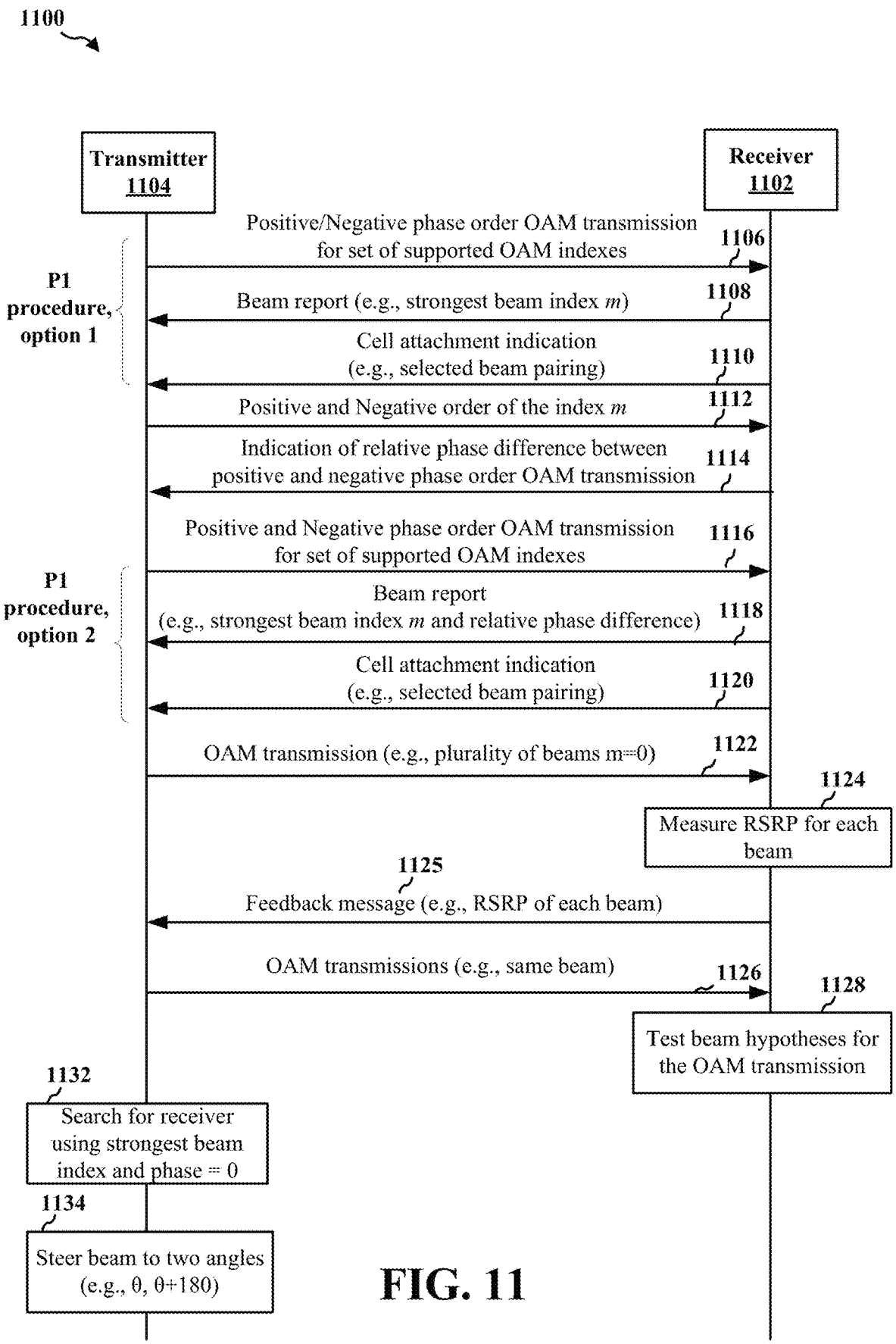
FIG. 11 is a call flow diagram of signaling between a transmitter and a receiver.

FIG. 11 is a call flow diagram 1100 of signaling between a receiver 1102 and a transmitter 1104. In some aspects, the transmitter 1104 may comprise a base station configured to provide at least one cell, and the receiver 1102 may comprise a UE configured to communicate with the transmitter 1104 (e.g., base station). For example, in the context of FIG. 1, the transmitter 1104 may correspond to base station 102/180 and, accordingly, the cell may include a geographic coverage area 110 in which communication coverage is provided and/or small cell 102' having a coverage area 110'. Further, a receiver 1102 may correspond to at least UE 104. In another example, in the context of FIG. 3, the transmitter 1104 may correspond to base station 310 and the receiver 1102 may correspond to UE 350. The aspects presented herein are not limited to use by a base station and a transmitter and by a UE as a receiver. The aspects presented herein for OAM beam management may be used by other OAM transmitters and receivers. As an example, the aspects may be applied by a UE as a transmitter and another UE as a transmitter or by a UE as a transmitter and a base station as a receiver.

As illustrated at 1106, the transmitter 1104 may transmit a positive phase order OAM transmission for a set of one or more supported OAM indexes (e.g., m=0, 1, 2). For example, the transmitter 1104 may transmit an SSB for each corresponding OAM index. The transmitter may transmit the positive phase order OAM transmission on at least one beam. The transmitter may transmit the positive phase order OAM transmission to the receiver 1102. The receiver 1102 may receive the positive phase order OAM transmission from the transmitter 1104. In some aspects, the transmitter may transmit the positive phase order OAM transmission on a plurality of beams. The positive phase order OAM transmission may be transmitted on the plurality of beams in a first slot.

As illustrated at 1108, the receiver reports the strongest OAM beam index, e.g., a value for m, based on the OAM transmissions for the set of supported OAM indexes. The transmitter 1104 may receive the beam report from the receiver 1102. The beam report may indicate a strongest beam index m of the plurality of beams. The strongest beam index m may be based on channel quality. In some aspects, the positive phase order OAM transmission and the negative phase order OAM transmission may be transmitted on a beam corresponding to the strongest beam index m reported by the receiver.

As illustrated at 1110, the receiver 1102 may transmit an indication to initiate a cell attachment procedure. The receiver may transmit the indication to initiate the cell attachment procedure to the transmitter 1104. The transmitter 1104 may receive the indication to initiate the cell attachment procedure from the receiver 1102. The indication to initiate the cell attachment procedure may include a beam pairing selected by the receiver. The beam pairing may be selected based on the strongest beam index m. The beam pairing may identify a transmission beam for the transmitter and may identify a receive beam for the receiver.

As illustrated at 1106, as an alternative to the transmission of the positive phase order OAM transmission for each of the supports OAM indexes, the transmitter 1104 may transmit a negative phase order OAM transmission for the set of one or more supported OAM indexes (e.g., m=0, 1, 2). For example, the transmitter 1104 may transmit an SSB for each corresponding OAM index. The transmitter may transmit the negative phase order OAM transmission on at least one beam. The transmitter may transmit the negative phase order OAM transmission to the receiver 1102. The receiver 1102 may receive the negative phase order OAM transmission from the transmitter 1104. In some aspects, the transmitter may transmit the negative phase order OAM transmission on a plurality of beams. The receiver reports the strongest OAM beam index, e.g., a value for m, based on the OAM transmissions for the set of supported OAM indexes, at 1108.

In some aspects, the transmitter may transmit the OAM transmission of each of a set of beams in the same time and frequency allocation. This may be achieved due to the beam's spatial separation. The receiver may experience interference in the boundaries of the two sequential beams, but may decode the SSB due to the orthogonality of the PSS, SSS and the low rate used in the PBCH. In some aspects, the transmitter may transmit the OAM transmission for different OAM indexes on each of the plurality of beams at different times. The transmission of the OAM transmissions at different times may allow for a time domain separation or use of different slots. This may allow the receiver to estimate the RSRP of each of the beams while minimizing interference. In some aspects, the transmitter may transmit the OAM transmission on the plurality of beams in different frequencies. The OAM transmissions being transmitted in different frequencies may be based on the receiver's capability to detect multiple OAM beams in different frequencies. In such instances, the beams may be interleaved for similar channel conditions.

After the P1 beam management procedure, e.g., in 1106-1110, the transmitter transmits OAM transmissions based on both positive and negative orders (e.g., ±m) of the index indicated in the report 1108 from the receiver 1102. The transmitter may transmit the positive and negative phase orders in a same slot or in sequential slots. At 1114, the receiver reports a relative phase difference between the positive and negative phase order OAM transmissions for the OAM index m. After receiving the indication, at 1114, the transmitter transmits a plurality of beams with m=0 and beam steering directed to the P1 selected OAM index to fill a full space coverage, e.g., at 1124.

In some aspects, rather than transmitting SSBs for each of the OAM indexes at 1106 with one of a positive phase order or a negative phase order, as part of the P1 procedure, the transmitter may transmit both positive and negative phase order OAM transmissions for each of the supported set of OAM indexes, at 1116, as part of a second option for the P1 beam management procedure. In some aspects, the transmitter may transmit the OAM transmissions in consecutive slots, e.g., a first slot for the positive phase order OAM transmission and a second slot for the negative phase order OAM transmission or vice versa. The negative phase order OAM transmission may be transmitted on the plurality of beams in a second slot. In some aspects, the positive phase order OAM transmission may be transmitted on the plurality of beams in the first slot and the negative phase order OAM transmission may be transmitted on the plurality of beams in the second slot, where the first slot and the second slot are consecutive slots. In such aspects, one slot may correspond for each phase order of the OAM index, where all the beams are transmitted in the same time and frequency allocation. This may be achieved due to the beam's spatial separation. The receiver may experience interference in the boundaries of the two sequential beams, but may decode the SSB due to the orthogonality of the PSS, SSS and the low rate used in the PBCH. In some aspects, the transmitter may transmit the positive phase order OAM transmission and the negative phase order OAM transmission on each of the plurality of beams at different times. The positive phase order and negative phase order OAM transmissions being transmitted at different times may allow for a time domain separation or use of different slots. This may allow the receiver to estimate the RSRP of all the beams while minimizing interference. The transmitter may transmit the negative and positive phase order indexes consecutively, e.g., transmitting based on a pattern of {0, 1, −1, 2, −2, . . . }. In some aspects, the transmitter may transmit the positive phase order OAM transmission and the negative phase order OAM transmission on the plurality of beams in different frequencies. The positive phase order and negative phase order OAM transmissions being transmitted in different frequencies may be based on the receiver's capability to detect multiple OAM beams in different frequencies. In such instances, the beams may be interleaved for similar channel conditions.

As illustrated at 1118, the receiver 1102 may transmit a report indicating both a strongest index m and a relative phase difference between the positive phase order OAM transmission (e.g., +m) and the negative phase order OAM transmission (e.g., −m). The strongest beam index m may be based on channel quality. The receiver may transmit the report indicating the strongest index and the relative phase difference between the positive phase order OAM transmission and the negative phase order OAM transmission to the transmitter 1104. The transmitter 1104 may receive the report indicating the relative phase difference between the positive phase order OAM transmission and the negative phase order OAM transmission from the receiver 1102. In some aspects, the report may indicate the relative phase difference of a strongest beam index from the plurality of beams. In some aspects, the report may indicate a strongest beam index m and indicates an angle θ relative to a center position. In some aspects, for example in instances where the report indicates that the strongest index m is 0, the report may not include a relative phase difference between the positive phase order OAM transmission and the negative phase order OAM transmission.

As illustrated at 1120, the receiver 1102 may transmit an indication to initiate a cell attachment procedure. The receiver may transmit the indication to initiate the cell attachment procedure to the transmitter 1104. The transmitter 1104 may receive the indication to initiate the cell attachment procedure from the receiver 1102. The indication to initiate the cell attachment procedure may include a beam pairing selected by the receiver. The beam pairing may be selected based on the strongest beam index m. The beam pairing may identify a transmission beam for the transmitter and may identify a receive beam for the receiver. In the second option, the P1 beam management procedure may comprise 1116-1120.

As illustrated at 1122, the transmitter 1104 may transmit an OAM transmission on a plurality of beams having a phase index of zero. The transmission may be a part of a P2 beam management procedure for both the first and second options. The transmitter may transmit the OAM transmission on the plurality of beams having the phase index of zero. The transmitter may transmit the OAM transmission on the plurality of beams having the phase index of zero to the receiver 1102. The receiver 1102 may receive the OAM transmission on the plurality of beams having the phase index of zero from the transmitter 1104. The transmitter may transmit the OAM transmission on the plurality of beams having the phase index of zero, as part of a transmission beam refinement procedure. The transmission beam refinement procedure may allow the transmitter to potentially switch an active beam to a strongest beam based on the transmission of the OAM transmission on the plurality of beams having the phase index of zero.

As illustrated at 1124, the receiver 1102 may measure a RSRP for each of the plurality of beams of the OAM transmission. The receiver may measure the RSRP for each of the plurality of beams having the index of zero. The receiver may measure the RSRP for each of the plurality of beams as part of the transmission beam refinement procedure initiated by the transmitter. The receiver may report the RSRP measurements, e.g., in a CRI-L1-RSRP feedback report, which may indicate the beams in a sorted manner, such as based on strongest to weakest or a subset of strongest beams. The transmitter may potentially change the active beam to the strongest beam reported by the receiver, e.g., in order to keep the link with a highest RSRP level and to support low mobility. The transmitter 1104 may receive the feedback message 1125 from the receiver 1102. The feedback message may allow for the transmitter to refine the transmission beam and the receiver to refine the reception beam in order to maximize the RSRP of the link between the transmitter and the receiver.

At 1126, the transmitter may further transmit multiple OAM transmissions using a same beam, e.g., as part of a P3 beam management procedure. The transmitter may transmit the OAM transmission on the same beam during consecutive symbols. The receiver uses the multiple transmissions on the same beam, at 1126 to perform beam hypotheses testing, at 1128.

As illustrated at 1128, the receiver 1102 may test multiple beam hypotheses for the OAM transmission. The receiver may test multiple beam hypotheses for the OAM transmission in different symbols. The receiver may test multiple beam hypotheses for the OAM transmission in different symbols in an effort to refine the receive beam of the receiver. In some aspects, the receiver may check multiple beams hypothesis from the same or different receiver panels.

As an example, in a first option, the P1 procedure may include 1106-1110, a P2 procedure may include 1112, 1114, and 1122-1125, and a P3 procedure may include 1126 and 1128. In a second option, the P1 procedure may include 1116-1120, a P2 procedure may include 1122-1125, and a P3 procedure may include 1126 and 1128.

As illustrated at 1132, the transmitter 1104 may search for the receiver. The transmitter may search for the receiver using the strongest beam index and a phase equal to 0. The report may indicate the strongest beam index m, such that the transmitter may search for the receiver using the strongest beam index based on the report from the receiver.

As illustrated at 1134, the transmitter 1104 may steer a beam to two angles of θ. The two angles of θ may comprise θ and θ+180. The transmitter may steer the beam at the two angles of θ based on the report indicating an angle θ relative to a center position in order to locate the receiver. In some aspects, for example a single receiver placed at an angle θ with respect to the center, there will be an opposite phase for +m and −m, and may be expressed by Equation 3.

$$\Psi_m = e^{i\alpha}e^{im\theta};\ \Psi_{-m} = e^{i\alpha}e^{-im\theta};\ \Psi_m\Psi^*_{-m} = e^{i2m\theta},\ \text{where}$$
$$\alpha \text{ is the unknown common phase.} \qquad \text{Equation 3:}$$

In some aspects, the receiver may report θ (in degrees) to the transmitter along with the desired OAM index. For example, for m=±1, the transmitter may search for the receiver with m=0 and beam steer to the two angles of θ and θ+180.

$$\Psi_{m=1} = e^{i\alpha}e^{i\theta} \qquad \text{Equation 4:}$$

In Equation 4, the parameter "α" represents aspects such as distance and/or other implementation aspects. A graphical representation 1000 of Equation 4 is depicted at 1010 of FIG. 10.

$$\Psi_{m=-1} = e^{i\alpha}e^{-i\theta} \qquad \text{Equation 5:}$$

In Equation 5, the parameter "α" represents aspects such as distance and/or other implementation aspects. A graphical representation of Equation 5 is depicted at 1020 of FIG. 10.

It may be appreciated that the first term "$e^{i\alpha}$" of the Equations 4 and 5 may be the same for the topological charge of m=1 (e.g., as shown in Equation 4) and for the topological charge of m=−1 (e.g., as shown in Equation 5). In some examples, to remove the first term "$e^{i\alpha}$" from the calculations, the first communication device 1202 may multiply the phase for m=1 ($\Psi_{m=1}$) and the conjugate of the phase for m=−1 ($\Psi^*_{m=-1}$) for each of the selected subset of antenna elements. For example, the first communication device 1202 may apply Equation 6 below to obtain the value "2θ."

$$\Psi_{m=1}*\Psi^*_{m=-1} = e^{i2\theta} \qquad \text{Equation 6:}$$

Figure 10:
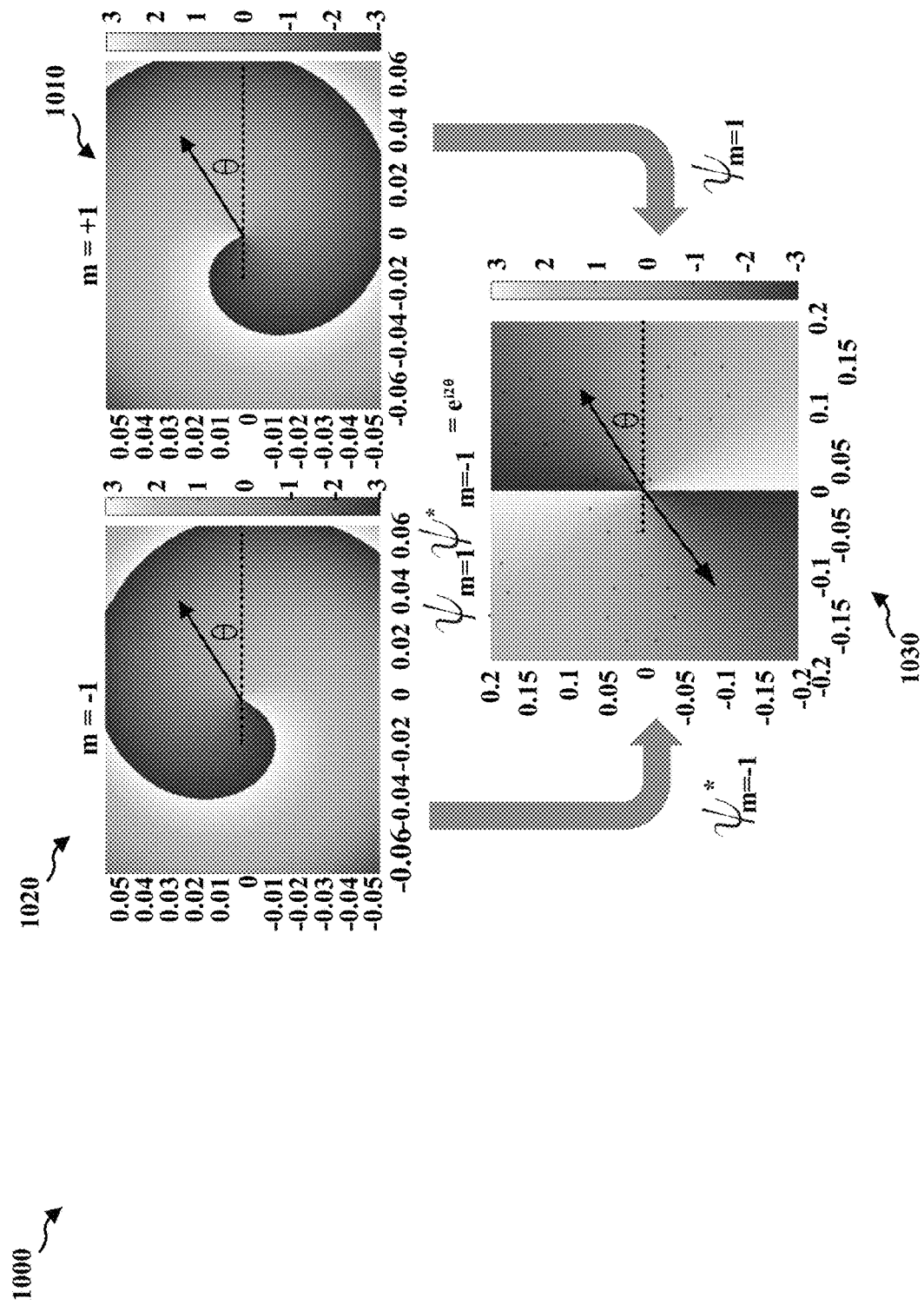
FIG. 10 depicts a graphical representation of phase measurements for a first helical structure and a second helical structure having an opposite rotational direction as the first helical structure.

A graphical representation of Equation 6 is depicted at 1030 of FIG. 10.

Figure 12:
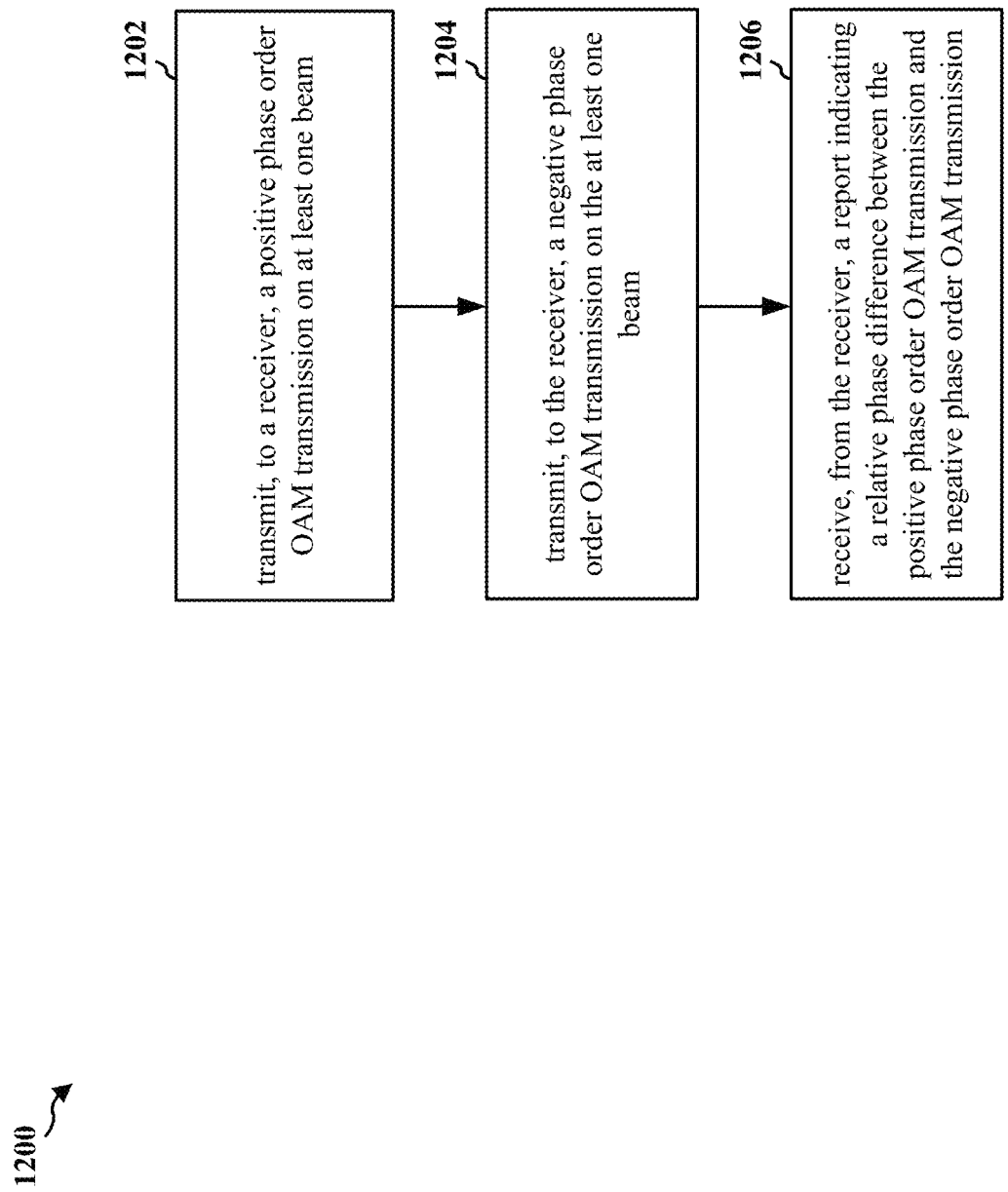
FIG. 12 is a flowchart of a method of wireless communication.

FIG. 12 is a flowchart 1200 of a method of wireless communication. The method may be performed by a transmitter or a component of a transmitter (e.g., the base station 102/180; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a transmitter to configure a receiver with a beam management procedure with small overhead using OAM.

At 1202, the transmitter may transmit a positive phase order OAM transmission. For example, 1202 may be performed by OAM component 1440 of apparatus 1402. The transmitter may transmit the positive phase order OAM transmission on at least one beam. The transmitter may transmit the positive phase order OAM transmission to a receiver. In some aspects, the transmitter may transmit the positive phase order OAM transmission on a plurality of beams. The positive phase order OAM transmission may be transmitted on the plurality of beams in a first slot. In the context of FIG. 11, the transmitter 1104, at 1106 or 1116, may transmit, to the receiver 1102, a positive phase order OAM transmission on at least one beam.

At 1204, the transmitter may transmit a negative phase order OAM transmission. For example, 1204 may be performed by OAM component 1440 of apparatus 1402. The transmitter may transmit the negative phase order OAM transmission on at least one beam. The transmitter may transmit the negative phase order OAM transmission to the receiver. In some aspects, the transmitter may transmit the negative phase order OAM transmission on a plurality of beams. The negative phase order OAM transmission may be transmitted on the plurality of beam in a second slot. In some aspects, the positive phase order OAM transmission may be transmitted on the plurality of beams in the first slot and the negative phase order OAM transmission may be transmitted on the plurality of beams in the second slot, where the first slot and the second slot are consecutive slots. In some aspects, the transmitter may transmit the positive phase order OAM transmission and the negative phase order OAM transmission on each of the plurality of beams at different times. In some aspects, the transmitter may transmit the positive phase order OAM transmission and the negative phase order OAM transmission on the plurality of beams in different frequencies. In the context of FIG. 11, the transmitter 1104, at 1106 or 1116, may transmit, to the receiver 1102, a negative phase order OAM transmission on at least one beam.

At 1206, the transmitter may receive a report indicating a relative phase difference between the positive phase order OAM transmission and the negative phase order OAM transmission. For example, 1206 may be performed by report component 1442 of apparatus 1402. The transmitter may receive the report indicting the relative phase difference between the positive phase order OAM transmission and the negative phase order OAM transmission from the receiver. In some aspects, the report may indicate the relative phase difference of a strongest beam index from the plurality of beams. In the context of FIG. 11, the transmitter 1108 or 1118, at 1110, may receive, from the receiver 1102, a report indicating a relative phase difference between the positive phase order OAM transmission and the negative phase order OAM transmission.

Figure 13:
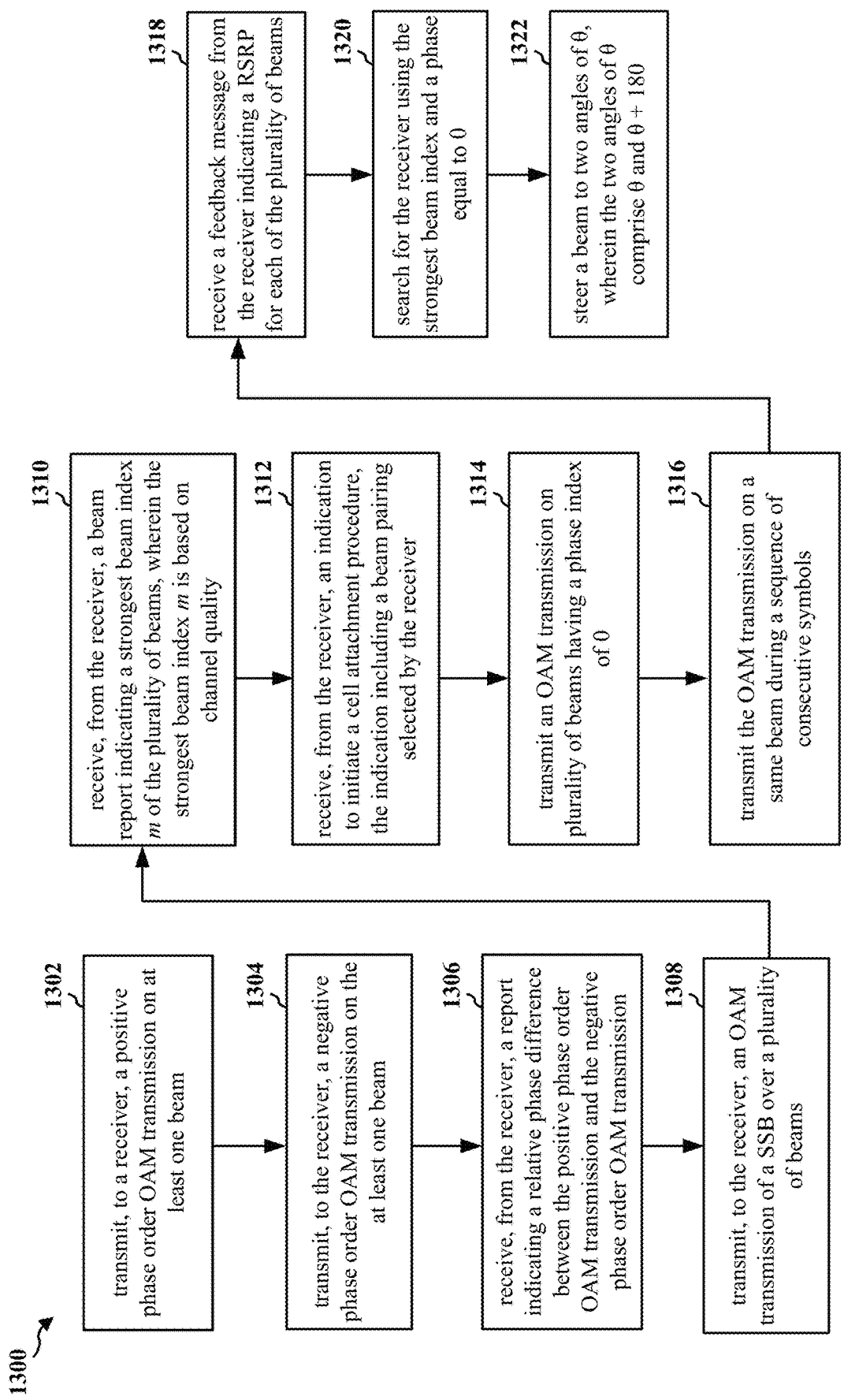
FIG. 13 is a flowchart of a method of wireless communication.

FIG. 13 is a flowchart 1300 of a method of wireless communication. The method may be performed by a transmitter or a component of a transmitter (e.g., the base station 102/180; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a transmitter to configure a receiver with a beam management procedure with small overhead using OAM.

At 1302, the transmitter may transmit a positive phase order OAM transmission. For example, 1302 may be performed by OAM component 1440 of apparatus 1402. The transmitter may transmit the positive phase order OAM transmission on at least one beam. The transmitter may transmit the positive phase order OAM transmission to a receiver. In some aspects, the transmitter may transmit the positive phase order OAM transmission on a plurality of beams. The positive phase order OAM transmission may be transmitted on the plurality of beams in a first slot. In the context of FIG. 11, the transmitter 1104, at 1106 or 1116, may transmit, to the receiver 1102, a positive phase order OAM transmission on at least one beam.

At 1304, the transmitter may transmit a negative phase order OAM transmission. For example, 1304 may be performed by OAM component 1440 of apparatus 1402. The transmitter may transmit the negative phase order OAM transmission on at least one beam. The transmitter may transmit the negative phase order OAM transmission to the receiver. In some aspects, the transmitter may transmit the negative phase order OAM transmission on a plurality of beams. The negative phase order OAM transmission may be transmitted on the plurality of beam in a second slot. In some aspects, the positive phase order OAM transmission may be transmitted on the plurality of beams in the first slot and the negative phase order OAM transmission may be transmitted on the plurality of beams in the second slot, where the first slot and the second slot are consecutive slots. In some aspects, the transmitter may transmit the positive phase order OAM transmission and the negative phase order OAM transmission on each of the plurality of beams at different times. In some aspects, the transmitter may transmit the positive phase order OAM transmission and the negative phase order OAM transmission on the plurality of beams in different frequencies. In the context of FIG. 11, the transmitter 1104, at 1106 or 1116, may transmit, to the receiver 1102, a negative phase order OAM transmission on at least one beam.

At 1306, the transmitter may receive a report indicating a relative phase difference between the positive phase order OAM transmission and the negative phase order OAM transmission. For example, 1306 may be performed by report component 1442 of apparatus 1402. In some aspects, the report may indicate the relative phase difference of a strongest beam index from the plurality of beams. In the context of FIG. 11, the transmitter 1104, at 1108 or 1118, may receive, from the receiver 1102, a report indicating a relative phase difference between the positive phase order OAM transmission and the negative phase order OAM transmission.

At 1308, the transmitter may transmit an OAM transmission of an SSB over a plurality of beams. For example, 1308 may be performed by OAM component 1440 of apparatus 1402. The transmitter may transmit the OAM transmission of the SSB over the plurality of beams to the receiver. In some aspects, the plurality of beams may comprise each beam supported by the transmitter for the OAM transmission. In some aspects, the transmitter may transmit the OAM transmission of the SSB on the plurality of beams in an overlapping time and frequency allocation. In some aspects, the transmitter may transmit the OAM transmission of the SSB on each of the plurality of beams at a different time. In some aspects, the transmitter may transmit the OAM transmission of the SSB on the plurality of beams in different frequencies. The beams associated with a plurality of beam indexes may be interleaved. In the context of FIG. 11, the transmitter 1104, at 1106 or 1116, may transmit an OAM transmission of an SSB over a plurality of beams.

At 1310, the transmitter may receive a beam report. For example, 1310 may be performed by report component 1442 of apparatus 1402. The transmitter may receive the beam report from the receiver. The beam report may indicate a strongest beam index m of the plurality of beams. The strongest beam index m may be based on channel quality. In some aspects, the positive phase order OAM transmission and the negative phase order OAM transmission may be transmitted on a beam corresponding to the strongest beam index m reported by the receiver. In some aspects, for example in instances where the report indicates that the strongest index m is 0, the report may not include a relative phase difference between the positive phase order OAM transmission and the negative phase order OAM transmission. In the context of FIG. 11, the transmitter 1104, at 1108, may receive a beam report from the receiver 1102.

At 1312, the transmitter may receive an indication to initiate a cell attachment procedure. For example, 1312 may be performed by cell attachment component 1444 of apparatus 1402. The transmitter may receive the indication to initiate the cell attachment procedure from the receiver. The indication to initiate the cell attachment procedure may include a beam pairing selected by the receiver. The beam pairing may be selected based on the strongest beam index m. The beam pairing may identify a transmission beam for the transmitter and may identify a receive beam for the receiver. In the context of FIG. 11, the transmitter 1104, at 1110 or 1120, may receive, from the receiver 1102, an indication to initiate a cell attachment procedure.

At 1314, the transmitter may transmit an OAM transmission on a plurality of beams having a phase index. For example, 1314 may be performed by OAM component 1440 of apparatus 1402. The transmitter may transmit the OAM transmission on the plurality of beams having the phase index of zero. The transmitter may transmit the OAM transmission on the plurality of beams having the phase index of zero to the receiver. The transmitter may transmit the OAM transmission on the plurality of beams having the phase index of zero, as part of a transmission beam refinement procedure. The transmission beam refinement procedure may allow the transmitter to potentially switch an active beam to a strongest beam based on the transmission of the OAM transmission on the plurality of beams having the phase index of zero. In the context of FIG. 11, the transmitter 1104, at 1122, may transmit, to the receiver 1102, an OAM transmission on a plurality of beams having a phase index.

At 1316, the transmitter may transmit the OAM transmission on a same beam. For example, 1316 may be performed by OAM component 1440 of apparatus 1402. The transmitter may transmit the OAM transmission on the same beam during a sequence of consecutive symbols. The transmission of the OAM transmission on the same beam during the sequence of the consecutive symbols may allow the receiver to refine a receive beam of the receiver by checking multiple beams hypothesis. In some aspects, the receiver may check multiple beams hypothesis from the same or different receiver panels. In the context of FIG. 11, the transmitter 1104, at 1126, may transmit, to the receiver 1102, the OAM transmission on a same beam.

At 1318, the transmitter may receive a feedback message from the receiver. For example, 1318 may be performed by feedback component 1446 of apparatus 1402. The feedback message from the receiver may indicate a reference signal received power (RSRP) for each of the plurality of beams. The feedback message may allow for the transmitter to refine the transmission beam and the receiver to refine the reception beam in order to maximize the RSRP of the link between the transmitter and the receiver. In the context of FIG. 11, the transmitter 1104, at 1125, may receive a feedback message from the receiver 1102.

At 1320, the transmitter may search for the receiver. For example, 1320 may be performed by beam component 1448 of apparatus 1402. The transmitter may search for the receiver using the strongest beam index and a phase equal to 0. The report may indicate the strongest beam index m, such that the transmitter may search for the receiver using the strongest beam index based on the report from the receiver. In the context of FIG. 11, the transmitter 1104, at 1132, may search for the receiver 1102.

At 1322, the transmitter may steer a beam to two angles of θ. For example, 1322 may be performed by beam component 1448 of apparatus 1402. The two angles of θ may comprise θ and θ+180. The transmitter may steer the beam at the two angles of θ based on the report indicating an angle θ relative to a center position. In the context of FIG. 11, the transmitter 1104, at 1134, may steer a beam to two angles of θ.

Figure 14:
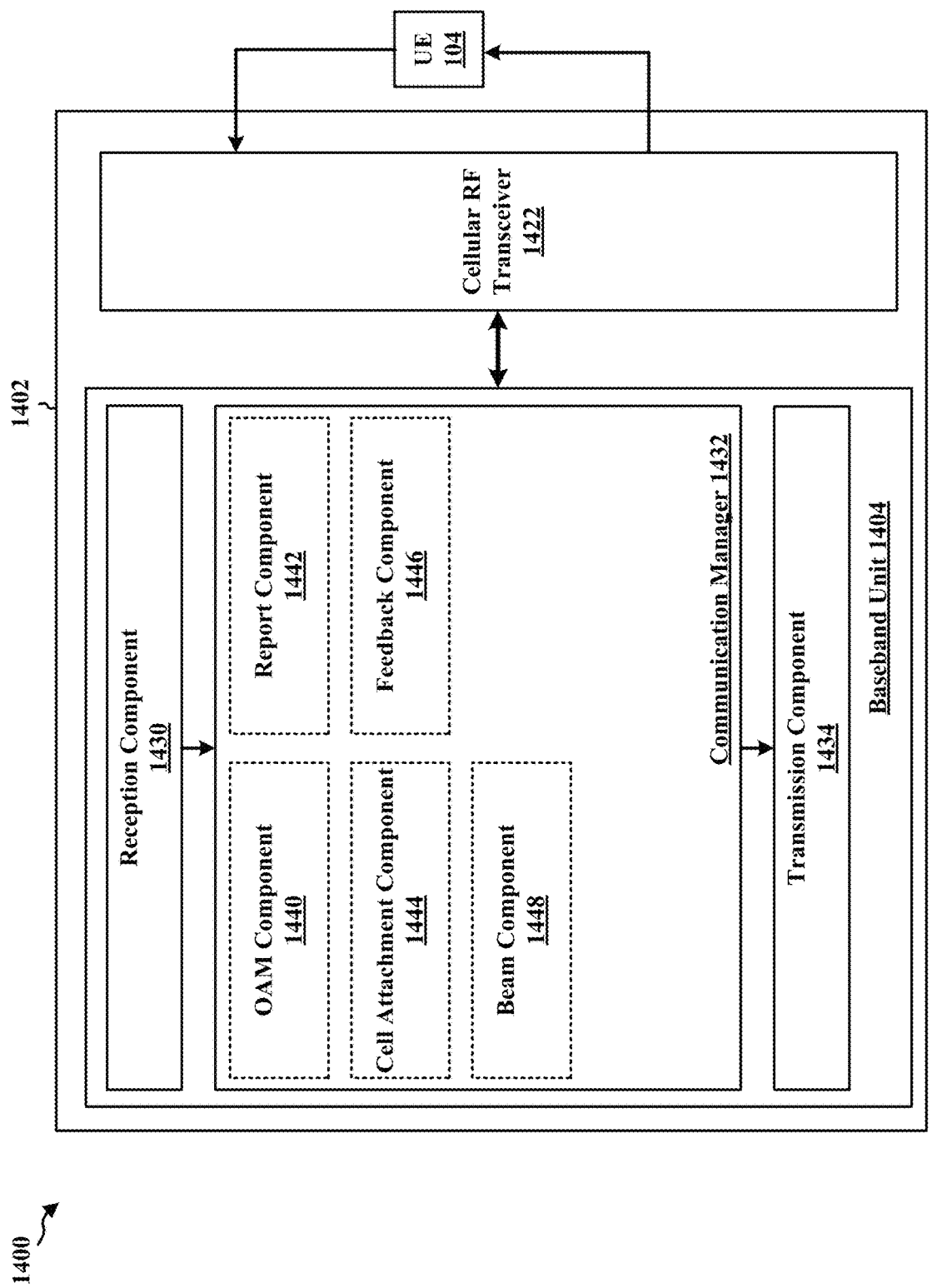
FIG. 14 is a diagram illustrating an example of a hardware implementation for an example apparatus.

FIG. 14 is a diagram 1400 illustrating an example of a hardware implementation for an apparatus 1402. The apparatus 1402 may be a transmitter, a component of a transmitter, or may implement transmitter functionality. In some aspects, the transmitter may comprise a base station. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes an OAM component 1440 that may transmit a positive phase order OAM transmission, e.g., as described in connection with 1202 of FIG. 12 or 1302 of FIG. 13. The OAM component 1440 may be configured to transmit a negative phase order OAM transmission, e.g., as described in connection with 1204 of FIG. 12 or 1304 of FIG. 13. The OAM component 1440 may be configured to transmit an OAM transmission of an SSB over a plurality of beams, e.g., as described in connection with 1308 of FIG. 13. The OAM component 1440 may be configured to transmit an OAM transmission on a plurality of beams having a phase index, e.g., as described in connection with 1314 of FIG. 13. The OAM component 1440 may be configured to transmit the OAM transmission on a same beam, e.g., as described in connection with 1316 of FIG. 13. The communication manager 1432 further includes a report component 1442 that may receive a report indicating a relative phase difference between the positive phase order OAM transmission and the negative phase order OAM transmission, e.g., as described in connection with 1306 of FIG. 13. The report component 1442 may be configured to receive a beam report, e.g., as described in connection with 1310 of FIG. 13. The communication manager 1432 further includes a cell attachment component 1444 that may receive an indication to initiate a cell attachment procedure, e.g., as described in connection with 1312 of FIG. 13. The communication manager 1432 further includes a feedback component 1446 that may receive a feedback message from the receiver, e.g., as described in connection with 1318 of FIG. 13. The communication manager 1432 further includes a beam component 1448 that may search for the receiver, e.g., as described in connection with 1320 of FIG. 13. The beam component 1448 may be configured to steer a beam to two angles of θ, e.g., as described in connection with 1322 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a receiver, a positive phase order OAM transmission on at least one beam. The apparatus includes means for transmitting, to the receiver, a negative phase order OAM transmission on the at least one beam. The apparatus includes means for receiving, from the receiver, a report indicating a relative phase difference between the positive phase order OAM transmission and the negative phase order OAM transmission. The apparatus further includes means for transmitting, to the receiver, an OAM transmission of a SSB over a plurality of beams. The apparatus further includes means for receiving, from the receiver, a beam report indicating a strongest beam index m of the plurality of beams. The strongest beam index m is based on channel quality. The positive phase order OAM transmission and the negative phase order OAM transmission are transmitted on a beam corresponding to the strongest beam index m reported by the receiver. The apparatus further includes means for receiving, from the receiver, an indication to initiate a cell attachment procedure. The indication including a beam pairing selected by the receiver. The beam pairing is selected based on the strongest beam index m. The beam pairing identifies a transmission beam for the transmitter and identifies a receive beam for the receiver. The apparatus further includes means for transmitting an OAM transmission on plurality of beams having a phase index of zero. The apparatus further includes means for receiving a feedback message from the receiver indicating an RSRP for each of the plurality of beams. The apparatus further includes means for transmitting the OAM transmission on a same beam during a sequence of consecutive symbols. The apparatus further includes means for searching for the receiver using the strongest beam index and a phase equal to 0. The apparatus further includes means for steering a beam to two angles of θ, wherein the two angles of θ comprise θ and θ+180. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 15:
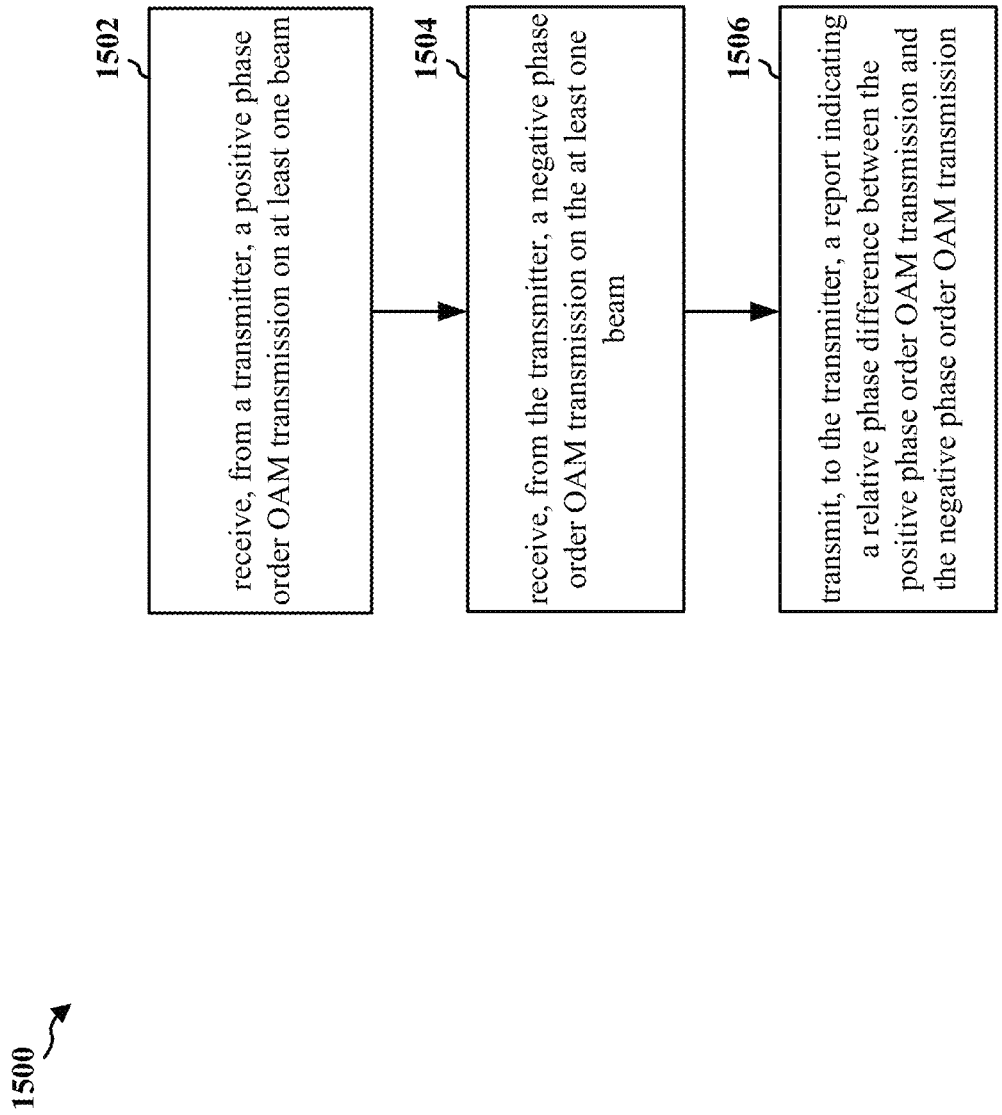
FIG. 15 is a flowchart of a method of wireless communication.

FIG. 15 is a flowchart 1500 of a method of wireless communication. The method may be performed by a receiver or a component of a receiver (e.g., the UE 104; the apparatus 1702; the cellular baseband processor 1704, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a receiver to be configured with a beam management procedure with small overhead using OAM.

At 1502, the receiver may receive a positive phase order OAM transmission. For example, 1502 may be performed by OAM component 1740 of apparatus 1702. The receiver may receive the positive phase order OAM transmission on at least one beam. The receiver may receive the positive order OAM transmission from a transmitter. In some aspects, the transmitter may transmit the positive phase order OAM transmission on a plurality of beams. The positive phase order OAM transmission may be transmitted on the plurality of beams in a first slot. In the context of FIG. 11, the receiver 1102, at 1106, may receive, from the transmitter 1104, a positive phase order OAM transmission.

At 1504, the receiver may receive a negative phase order OAM transmission. For example, 1504 may be performed by OAM component 1740 of apparatus 1702. The receiver may receive the negative phase order OAM transmission on the at least one beam. The receiver may receive the negative phase order OAM transmission from the transmitter. In some aspects, the transmitter may transmit the negative phase order OAM transmission on a plurality of beams. The negative phase order OAM transmission may be transmitted on the plurality of beam in a second slot. In some aspects, the positive phase order OAM transmission may be transmitted on the plurality of beams in the first slot and the negative phase order OAM transmission may be transmitted on the plurality of beams in the second slot, where the first slot and the second slot are consecutive slots. In some aspects, the transmitter may transmit the positive phase order OAM transmission and the negative phase order OAM transmission on each of the plurality of beams at different times. In some aspects, the transmitter may transmit the positive phase order OAM transmission and the negative phase order OAM transmission on the plurality of beams in different frequencies. In the context of FIG. 11, the receiver 1102, at 1106, may receive, from the transmitter 1104, a negative phase order OAM transmission.

At 1506, the receiver may transmit a report indicating a relative phase difference between the positive phase order OAM transmission and the negative phase order OAM transmission. For example, 1506 may be performed by report component 1742 of apparatus 1702. The receiver may transmit the report indicating the relative phase difference between the positive phase order OAM transmission and the negative phase order OAM transmission to the transmitter. In some aspects, the report may indicate a strongest beam index m and indicates an angle θ relative to a center position. In some aspects, for example in instances where the report indicates that the strongest index m is 0, the report may not include a relative phase difference between the positive phase order OAM transmission and the negative phase order OAM transmission. In the context of FIG. 11, the receiver 1102, at 1118, may transmit a report indicating a relative phase difference between the positive phase order OAM transmission and the negative phase order OAM transmission.

Figure 16:
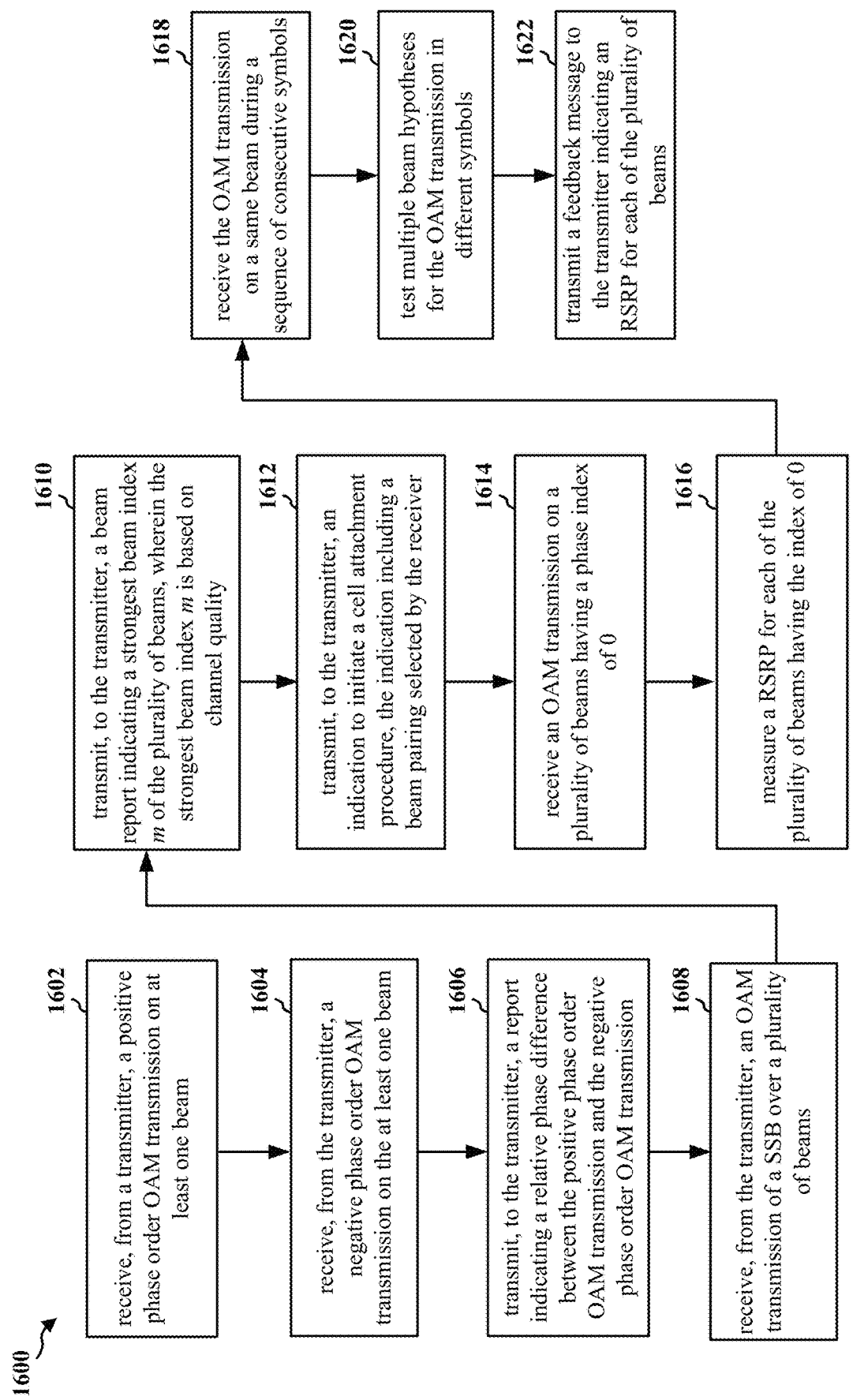
FIG. 16 is a flowchart of a method of wireless communication.

FIG. 16 is a flowchart 1600 of a method of wireless communication. The method may be performed by a receiver or a component of a receiver (e.g., the UE 104; the apparatus 1702; the cellular baseband processor 1704, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a receiver to be configured with a beam management procedure with small overhead using OAM.

At 1602, the receiver may receive a positive phase order OAM transmission. For example, 1602 may be performed by OAM component 1740 of apparatus 1702. The receiver may receive the positive phase order OAM transmission on at least one beam. The receiver may receive the positive order OAM transmission from a transmitter. In some aspects, the transmitter may transmit the positive phase order OAM transmission on a plurality of beams. The positive phase order OAM transmission may be transmitted on the plurality of beams in a first slot. In the context of FIG. 11, the receiver 1102, at 1106, may receive, from the transmitter 1104, a positive phase order OAM transmission.

At 1604, the receiver may receive a negative phase order OAM transmission. For example, 1604 may be performed by OAM component 1740 of apparatus 1702. The receiver may receive the negative phase order OAM transmission on the at least one beam. The receiver may receive the negative phase order OAM transmission from the transmitter. In some aspects, the transmitter may transmit the negative phase order OAM transmission on a plurality of beams. The negative phase order OAM transmission may be transmitted on the plurality of beam in a second slot. In some aspects, the positive phase order OAM transmission may be transmitted on the plurality of beams in the first slot and the negative phase order OAM transmission may be transmitted on the plurality of beams in the second slot, where the first slot and the second slot are consecutive slots. In some aspects, the transmitter may transmit the positive phase order OAM transmission and the negative phase order OAM transmission on each of the plurality of beams at different times. In some aspects, the transmitter may transmit the positive phase order OAM transmission and the negative phase order OAM transmission on the plurality of beams in different frequencies. In the context of FIG. 11, the receiver 1102, at 1106, may receive, from the transmitter 1104, a negative phase order OAM transmission.

At 1606, the receiver may transmit a report indicating a relative phase difference between the positive phase order OAM transmission and the negative phase order OAM transmission. For example, 1606 may be performed by report component 1742 of apparatus 1702. The receiver may transmit the report indicating the relative phase difference between the positive phase order OAM transmission and the negative phase order OAM transmission to the transmitter. In some aspects, the report may indicate a strongest beam index m and indicates an angle θ relative to a center position. In some aspects, for example in instances where the report indicates that the strongest index m is 0, the report may not include a relative phase difference between the positive phase order OAM transmission and the negative phase order OAM transmission. In the context of FIG. 11, the receiver 1102, at 1118, may transmit a report indicating a relative phase difference between the positive phase order OAM transmission and the negative phase order OAM transmission.

At 1608, the receiver may receive an OAM transmission of an SSB over a plurality of beams. For example, 1608 may be performed by OAM component 1740 of apparatus 1702. The receiver may receive the OAM transmission of the SSB over the plurality of beams from the transmitter. In some aspects, the plurality of beams may comprise each beam supported by the transmitter for the OAM transmission. In some aspects, the transmitter may transmit the OAM transmission of the SSB on the plurality of beams in an overlapping time and frequency allocation. In some aspects, the transmitter may transmit the OAM transmission of the SSB on each of the plurality of beams at a different time. In some aspects, the transmitter may transmit the OAM transmission of the SSB on the plurality of beams in different frequencies. The beams associated with a plurality of beam indexes may be interleaved. In the context of FIG. 11, the receiver 1102, at 1106, may receive, from the transmitter 1104, an OAM transmission of an SSB over a plurality of beams.

At 1610, the receiver may transmit a beam report. For example, 1610 may be performed by report component 1742 of apparatus 1702. The receiver the transmit the report to the transmitter. The beam report may indicate a strongest beam index m of the plurality of beams. The strongest beam index m may be based on channel quality. In some aspects, the positive phase order OAM transmission and the negative phase order OAM transmission may be transmitted on a beam corresponding to the strongest beam index m reported by the receiver. In the context of FIG. 11, the receiver 1102, at 1108, may transmit a beam report to the transmitter 1104.

At 1612, the receiver may transmit an indication to initiate a cell attachment procedure. For example, 1612 may be performed by cell attachment component 1744 of apparatus 1702. The receiver may transmit the indication to initiate the cell attachment procedure to the transmitter. The indication to initiate the cell attachment procedure may include a beam pairing selected by the receiver. The beam pairing may be selected based on the strongest beam index m. The beam pairing may identify a transmission beam for the transmitter and may identify a receive beam for the receiver. In the context of FIG. 11, the receiver 1102, at 1110 or 1120, may transmit, to the transmitter 1104, an indication to initiate a cell attachment procedure.

At 1614, the receiver may receive an OAM transmission on a plurality of beams having a phase index. For example, 1614 may be performed by OAM component 1740 of apparatus 1702. The receiver may receive the OAM transmission on the plurality of beams having the phase index of zero. The receiver may receive the OAM transmission on the plurality of beams having the phase index of zero from the transmitter. The transmitter may transmit the OAM transmission on the plurality of beams having the phase index of zero, as part of a transmission beam refinement procedure. The transmission beam refinement procedure may allow the transmitter to potentially switch an active beam to a strongest beam based on the transmission of the OAM transmission on the plurality of beams having the phase index of zero. In the context of FIG. 11, the receiver 1102, at 1120, may receive, from the transmitter 1104, an OAM transmission on a plurality of beams having a phase index.

At 1616, the receiver may measure a RSRP for each of the plurality of beams. For example, 1616 may be performed by beam component 1746 of apparatus 1702. The receiver may measure the RSRP for each of the plurality of beams having the index of zero. The receiver may measure the RSRP for each of the plurality of beams as part of the transmission beam refinement procedure initiated by the transmitter. In the context of FIG. 11, the receiver 1102, at 1124, may measure a RSRP for each of the plurality of beams.

At 1618, the receiver may receive the OAM transmission on a same beam. For example, 1618 may be performed by beam component 1746 of apparatus 1702. The receiver may receive the OAM transmission on the same beam during a sequence of consecutive symbols. The transmission of the OAM transmission on the same beam during the sequence of the consecutive symbols may allow the receiver to refine a receive beam of the receiver. In the context of FIG. 11, the receiver 1102, at 1126, may receive, from the transmitter 1104, the OAM transmission on a same beam.

At 1620, the receiver may test multiple beam hypotheses for the OAM transmission. For example, 1620 may be performed by beam component 1746 of apparatus 1702. The receiver may test multiple beam hypotheses for the OAM transmission in different symbols. In some aspects, the receiver may check multiple beams hypothesis from the same or different receiver panels. In the context of FIG. 11, the receiver 1102, at 1128, may test multiple beam hypotheses for the OAM transmission.

At 1622, the receiver may transmit a feedback message to the transmitter. For example, 1622 may be performed by feedback component 1748 of apparatus 1702. The receiver may transmit the feedback message to the transmitter indicating an RSRP for each of the plurality of beams. The feedback message may allow for the transmitter to refine the transmission beam and the receiver to refine the reception beam in order to maximize the RSRP of the link between the transmitter and the receiver. In the context of FIG. 11, the receiver 1102, at 1125, may transmit a feedback message to the transmitter 1104.

Figure 17:
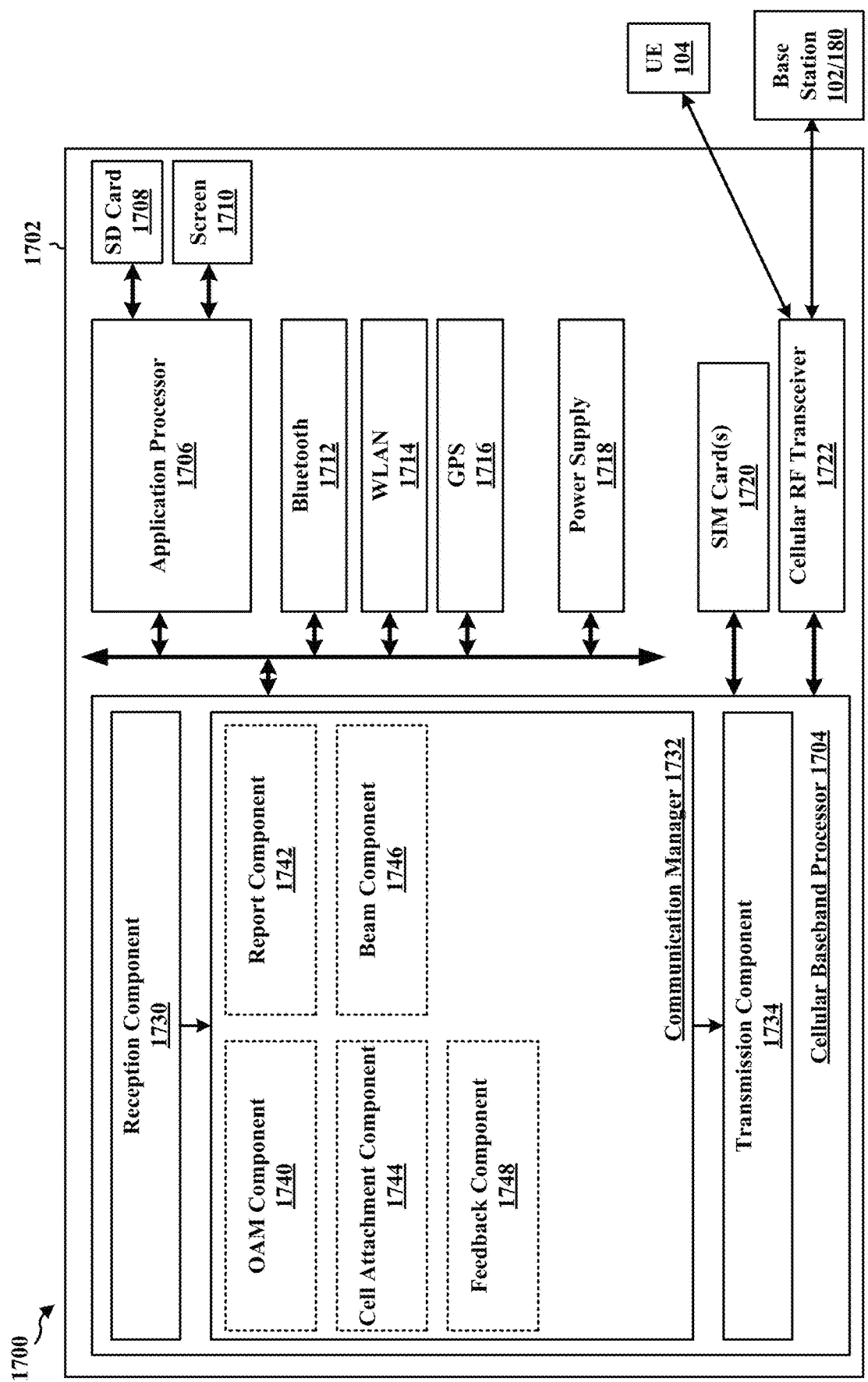
FIG. 17 is a diagram illustrating an example of a hardware implementation for an example apparatus.

FIG. 17 is a diagram 1700 illustrating an example of a hardware implementation for an apparatus 1702. The apparatus 1702 may be a receiver, a component of a receiver, or may implement receiver functionality. In some aspects, the apparatus 1702 may comprise a UE. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes an OAM component 1740 that is configured to receive a positive phase order OAM transmission, e.g., as described in connection with 1502 of FIG. 15 or 1602 of FIG. 16. The OAM component 1740 may be configured to receive a negative phase order OAM transmission, e.g., as described in connection with 1504 of FIG. 15 or 1604 of FIG. 16. The OAM component 1740 may be configured to receive an OAM transmission of an SSB over a plurality of beams, e.g., as described in connection with 1608 of FIG. 16. The OAM component 1740 may be configured to receive an OAM transmission on a plurality of beams having a phase index, e.g., as described in connection with 1614 of FIG. 16. The OAM component 1740 may be configured to receive the OAM transmission on a same beam, e.g., as described in connection with 1618 of FIG. 16. The communication manager 1732 further includes a report component 1742 that is configured to transmit a report indicating a relative phase difference between the positive phase order OAM transmission and the negative phase order OAM transmission, e.g., as described in connection with 1506 of FIG. 15 or 1606 of FIG. 16. The report component 1742 may be configured to transmit a beam report, e.g., as described in connection with 1610 of FIG. 16. The communication manager 1732 further includes a cell attachment component 1744 that is configured to transmit an indication to initiate a cell attachment procedure, e.g., as described in connection with 1612 of FIG. 16. The communication manager 1732 further includes a beam component 1746 that is configured to measure a RSRP for each of the plurality of beams, e.g., as described in connection with 1616 of FIG. 16. The beam component 1746 may be configured to test multiple beam hypotheses for the OAM transmission, e.g., as described in connection with 1620 of FIG. 16. The communication manager 1732 further includes a feedback component 1748 that is configured to transmit a feedback message to the transmitter, e.g., as described in connection with 1622 of FIG. 16.

The apparatus may include additional components that perform each of the blocks of the algorithm in the flowcharts of FIG. 15 or 16. As such, each block in the flowcharts of FIG. 15 or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for receiving, from a transmitter, a positive phase order OAM transmission on at least one beam. The apparatus includes means for receiving, from the transmitter, a negative phase order OAM transmission on the at least one beam. The apparatus includes means for transmitting, to the transmitter, a report indicating a relative phase difference between the positive phase order OAM transmission and the negative phase order OAM transmission. The apparatus further includes means for receiving, from the transmitter, an OAM transmission of an SSB over a plurality of beams. The apparatus further includes means for transmitting, to the transmitter, a beam report indicating a strongest beam index m of the plurality of beams, wherein the strongest beam index m is based on channel quality. The positive phase order OAM transmission and the negative phase order OAM transmission are transmitted on a beam corresponding to the strongest beam index m reported by the receiver. The apparatus further includes means for transmitting, to the transmitter, an indication to initiate a cell attachment procedure. The indication including a beam pairing selected by the receiver. The beam pairing is selected based on the strongest beam index m. The beam pairing identifies a transmission beam for the transmitter and identifies a receive beam for the receiver. The apparatus further includes means for receiving an OAM transmission on a plurality of beams having a phase index of zero. The apparatus further includes means for measuring an RSRP for each of the plurality of beams having the index of zero. The apparatus further includes means for transmitting a feedback message to the transmitter indicating an RSRP for each of the plurality of beams. The apparatus further includes means for receiving the OAM transmission on a same beam during a sequence of consecutive symbols. The apparatus further includes means for testing multiple beam hypotheses for the OAM transmission in different symbols. The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a transmitter including a memory and at least one processor coupled to the memory and configured to transmit, to a receiver, a positive phase order OAM transmission on at least one beam; transmit, to the receiver, a negative phase order OAM transmission on the at least one beam; and receive, from the receiver, a report indicating a relative phase difference between the positive phase order OAM transmission and the negative phase order OAM transmission.

Aspect 2 is the apparatus of Aspect 1, further includes a transceiver coupled to the at least one processor.

Aspect 3 is the apparatus of Aspects 1 and 2, further includes that the at least one processor is further configured to transmit, to the receiver, an OAM transmission of a SSB over a plurality of beams; and receive, from the receiver, a beam report indicating a strongest beam index m of the plurality of beams, wherein the strongest beam index m is based on channel quality, wherein the positive phase order OAM transmission and the negative phase order OAM transmission are transmitted on a beam corresponding to the strongest beam index m reported by the receiver.

Aspect 4 is the apparatus of Aspects 1-3, further includes that the at least one processor is further configured to receive, from the receiver, an indication to initiate a cell attachment procedure, the indication including a beam pairing selected by the receiver, wherein the beam pairing is selected based on the strongest beam index m, wherein the beam pairing identifies a transmission beam for the transmitter and identifies a receive beam for the receiver.

Aspect 5 is the apparatus of Aspects 1-4, further includes that the plurality of beams comprises each beam supported by the transmitter for the OAM transmission.

Aspect 6 is the apparatus of Aspects 1-5, further includes that the transmitter transmits the OAM transmission of the SSB on the plurality of beams in an overlapping time and frequency allocation, or wherein the transmitter transmits the OAM transmission of the SSB on each of the plurality of beams at a different time.

Aspect 7 is the apparatus of Aspects 1-6, further includes that the transmitter transmits the OAM transmission of the SSB on the plurality of beams in different frequencies.

Aspect 8 is the apparatus of Aspects 1-7, further includes that beams associated with a plurality of beam indexes are interleaved.

Aspect 9 is the apparatus of Aspects 1-8, further includes that the transmitter transmits the positive phase order OAM transmission and the negative phase order OAM transmission on a plurality of beams, wherein the report indicates the relative phase difference of a strongest beam index from the plurality of beams.

Aspect 10 is the apparatus of Aspects 1-9, further includes that the positive phase order OAM transmission is transmitted on the plurality of beams in a first slot and the negative phase order OAM transmission is transmitted on the plurality of beams in a second slot, the first slot and the second slot being consecutive.

Aspect 11 is the apparatus of Aspects 1-10, further includes that the transmitter transmits the positive phase order OAM transmission and the negative phase order OAM transmission on each of the plurality of beams at different times.

Aspect 12 is the apparatus of Aspects 1-11, further includes that the transmitter transmits the positive phase order OAM transmission and the negative phase order OAM transmission on the plurality of beams in different frequencies.

Aspect 13 is the apparatus of Aspects 1-12, further includes that the at least one processor is further configured to transmit an OAM transmission on plurality of beams having a phase index of 0; and receive a feedback message from the receiver indicating a RSRP for each of the plurality of beams.

Aspect 14 is the apparatus of Aspects 1-13, further includes that the at least one processor is further configured to transmit the OAM transmission on a same beam during a sequence of consecutive symbols.

Aspect 15 is the apparatus of Aspects 1-14, further includes that the report indicates a strongest beam index m and indicates an angle θ relative to a center position, wherein the at least one processor is further configured to search for the receiver using the strongest beam index m and a phase equal to 0; and steer a beam to two angles of θ, wherein the two angles of θ comprise θ and θ+180.

Aspect 16 is a method of wireless communication for implementing any of Aspects 1-15.

Aspect 17 is an apparatus for wireless communication including means for implementing any of Aspects 1-15.

Aspect 18 is a computer-readable medium storing computer executable code, where the code when executed by a processor causes the processor to implement any of Aspects 1-15.

Aspect 19 is an apparatus for wireless communication at a receiver including a memory and at least one processor coupled to the memory and configured to receive, from a transmitter, a positive phase order OAM transmission on at least one beam; receive, from the transmitter, a negative phase order OAM transmission on the at least one beam; and transmit, to the transmitter, a report indicating a relative phase difference between the positive phase order OAM transmission and the negative phase order OAM transmission.

Aspect 20 is the apparatus of Aspect 19, further includes a transceiver coupled to the at least one processor.

Aspect 21 is the apparatus of Aspects 19 and 20, further includes that the at least one processor is further configured to receive, from the transmitter, an OAM transmission of a SSB over a plurality of beams; and transmit, to the transmitter, a beam report indicating a strongest beam index m of the plurality of beams, wherein the strongest beam index m is based on channel quality, wherein the positive phase order OAM transmission and the negative phase order OAM transmission are transmitted on a beam corresponding to the strongest beam index m reported by the receiver.

Aspect 22 is the apparatus of Aspects 19-21, further includes that the at least one processor is further configured to transmit, to the transmitter, an indication to initiate a cell attachment procedure, the indication including a beam pairing selected by the receiver, wherein the beam pairing is selected based on the strongest beam index m, wherein the beam pairing identifies a transmission beam for the transmitter and identifies a receive beam for the receiver.

Aspect 23 is the apparatus of Aspects 19-22, further includes that the plurality of beams comprises each beam supported by the transmitter for the OAM transmission, wherein the transmitter transmits the OAM transmission of the SSB on the plurality of beams in an overlapping time and frequency allocation, or wherein the transmitter transmits the OAM transmission of the SSB on each of the plurality of beams at a different time.

Aspect 24 is the apparatus of Aspects 19-23, further includes that the transmitter transmits the OAM transmission of the SSB on the plurality of beams in different frequencies, wherein beams associated with a plurality of beam indexes are interleaved.

Aspect 25 is the apparatus of Aspects 19-24, further includes that the transmitter transmits the positive phase order OAM transmission and the negative phase order OAM transmission on a plurality of beams, wherein the report indicates the relative phase difference of a strongest beam index from the plurality of beams.

Aspect 26 is the apparatus of Aspects 19-25, further includes that the positive phase order OAM transmission is transmitted on the plurality of beams in a first slot and the negative phase order OAM transmission is transmitted on the plurality of beams in a second slot, the first slot and the second slot being consecutive.

Aspect 27 is the apparatus of Aspects 19-26, further includes that the transmitter transmits the positive phase order OAM transmission and the negative phase order OAM transmission on each of the plurality of beams at different times.

Aspect 28 is the apparatus of Aspects 19-27, further includes that the transmitter transmits the positive phase order OAM transmission and the negative phase order OAM transmission on the plurality of beams in different frequencies.

Aspect 29 is the apparatus of Aspects 19-28, further includes that the at least one processor is further configured to receive an OAM transmission on a plurality of beams having a phase index of 0; measure a reference signal received power (RSRP) for each of the plurality of beams having the phase index of 0; and transmit a feedback message to the transmitter indicating an RSRP for each of the plurality of beams.

Aspect 30 is the apparatus of Aspects 19-29, further includes that the at least one processor is further configured to receive the OAM transmission on a same beam during a sequence of consecutive symbols; and test multiple beam hypotheses for the OAM transmission in different symbols.

Aspect 31 is the apparatus of 19-30, further includes that the report indicates a strongest beam index m and indicates an angle θ relative to a center position.

Aspect 32 is a method of wireless communication for implementing any of Aspects 19-31.

Aspect 33 is an apparatus for wireless communication including means for implementing any of Aspects 19-31.

Aspect 34 is a computer-readable medium storing computer executable code, where the code when executed by a processor causes the processor to implement any of Aspects 19-31.

What is claimed is:

1. An apparatus for wireless communication at a transmitter, comprising a memory; and
at least one processor coupled to the memory and configured to:
transmit, to a receiver, a positive phase order orbital angular momentum (OAM) transmission on at least one beam;
transmit, to the receiver, a negative phase order OAM transmission on the at least one beam;
receive, from the receiver, a report indicating a relative phase difference between the positive phase order OAM transmission and the negative phase order OAM transmission; and
receive, from the receiver, a beam report indicating a strongest beam index m of the plurality of beams, wherein the strongest beam index m is based on channel quality,
wherein the positive phase order OAM transmission and the negative phase order OAM transmission are transmitted on a beam corresponding to the strongest beam index m.

2. The apparatus of claim 1, further comprising a transceiver coupled to the at least one processor.

3. The apparatus of claim 1, wherein the at least one processor is further configured to:
transmit, to the receiver, an OAM transmission of a synchronization signal block (SSB) over a plurality of beams.

4. The apparatus of claim 3, wherein the at least one processor is further configured to:
receive, from the receiver, an indication to initiate a cell attachment procedure, the indication including a beam pairing selected by the receiver, wherein the beam pairing is selected based on the strongest beam index m, wherein the beam pairing identifies a transmission beam for the transmitter and identifies a receive beam for the receiver.

5. The apparatus of claim 3, wherein the plurality of beams comprises each beam supported by the transmitter for the OAM transmission.

6. The apparatus of claim 3, wherein the transmitter transmits the OAM transmission of the SSB on the plurality of beams in an overlapping time and frequency allocation, or wherein the transmitter transmits the OAM transmission of the SSB on each of the plurality of beams at a different time.

7. The apparatus of claim 3, wherein the transmitter transmits the OAM transmission of the SSB on the plurality of beams in different frequencies.

8. The apparatus of claim 7, wherein beams associated with a plurality of beam indexes are interleaved.

9. The apparatus of claim 1, wherein the transmitter transmits the positive phase order OAM transmission and the negative phase order OAM transmission on a plurality of beams,
wherein the report indicates the relative phase difference of a strongest beam index from the plurality of beams.

10. The apparatus of claim 9, wherein the positive phase order OAM transmission is transmitted on the plurality of beams in a first slot and the negative phase order OAM transmission is transmitted on the plurality of beams in a second slot, the first slot and the second slot being consecutive.

11. The apparatus of claim 9, wherein the transmitter transmits the positive phase order OAM transmission and the negative phase order OAM transmission on each of the plurality of beams at different times.

12. The apparatus of claim 9, wherein the transmitter transmits the positive phase order OAM transmission and the negative phase order OAM transmission on the plurality of beams in different frequencies.

13. The apparatus of claim 1, wherein the at least one processor is further configured to:
transmit an OAM transmission on plurality of beams having a phase index of 0; and
receive a feedback message from the receiver indicating a reference signal received power (RSRP) for each of the plurality of beams.

14. The apparatus of claim 13, wherein the at least one processor is further configured to:
transmit the OAM transmission on a same beam during a sequence of consecutive symbols.

15. The apparatus of claim 1, wherein the report indicates a strongest beam index m and indicates an angle θ relative to a center position, wherein the at least one processor is further configured to:
search for the receiver using the strongest beam index m and a phase equal to 0; and
steer a beam to two angles of θ, wherein the two angles of θ comprise θ and θ+180.

16. A method of wireless communication at a transmitter, comprising:
transmitting, to a receiver, a positive phase order orbital angular momentum (OAM) transmission on at least one beam;
transmitting, to the receiver, a negative phase order OAM transmission on the at least one beam;
receiving, from the receiver, a report indicating a relative phase difference between the positive phase order OAM transmission and the negative phase order OAM transmission; and
receiving from the receiver, a beam report indicating a strongest beam index m of the plurality of beams, wherein the strongest beam index m is based on channel quality,
wherein the positive phase order OAM transmission and the negative phase order OAM transmission are transmitted on a beam corresponding to the strongest beam index m.

17. An apparatus for wireless communication at a receiver, comprising:
a memory; and
at least one processor coupled to the memory and configured to:
receive, from a transmitter, a positive phase order orbital angular momentum (OAM) transmission on at least one beam;
receive, from the transmitter, a negative phase order OAM transmission on the at least one beam;
transmit, to the transmitter, a report indicating a relative phase difference between the positive phase order OAM transmission and the negative phase order OAM transmission; and
transmit, to the transmitter, a beam report indicating a strongest beam index m of the plurality of beams, wherein the strongest beam index m is based on channel quality, wherein the positive phase order OAM transmission and the negative phase order OAM transmission are transmitted on a beam corresponding to the strongest beam index m.

18. The apparatus of claim 17, further comprising a transceiver coupled to the at least one processor.

19. The apparatus of claim 17, wherein the at least one processor is further configured to:
receive, from the transmitter, an OAM transmission of a synchronization signal block (SSB) over a plurality of beams; and.

20. The apparatus of claim 19, wherein the at least one processor is further configured to:
transmit, to the transmitter, an indication to initiate a cell attachment procedure, the indication including a beam pairing selected by the receiver, wherein the beam pairing is selected based on the strongest beam index m, wherein the beam pairing identifies a transmission beam for the transmitter and identifies a receive beam for the receiver.

21. The apparatus of claim 19, wherein the plurality of beams comprises each beam supported by the transmitter for the OAM transmission,
wherein the transmitter transmits the OAM transmission of the SSB on the plurality of beams in an overlapping time and frequency allocation, or
wherein the transmitter transmits the OAM transmission of the SSB on each of the plurality of beams at a different time.

22. The apparatus of claim 19, wherein the transmitter transmits the OAM transmission of the SSB on the plurality of beams in different frequencies, wherein beams associated with a plurality of beam indexes are interleaved.

23. The apparatus of claim 17, wherein the transmitter transmits the positive phase order OAM transmission and the negative phase order OAM transmission on a plurality of beams, wherein the report indicates the relative phase difference of a strongest beam index from the plurality of beams.

24. The apparatus of claim 23, wherein the positive phase order OAM transmission is transmitted on the plurality of beams in a first slot and the negative phase order OAM transmission is transmitted on the plurality of beams in a second slot, the first slot and the second slot being consecutive.

25. The apparatus of claim 23, wherein the transmitter transmits the positive phase order OAM transmission and the negative phase order OAM transmission on each of the plurality, of beams at different times.

26. The apparatus of claim 23, wherein the transmitter transmits the positive phase order OAM transmission and the negative phase order OAM transmission on the plurality of beams in different frequencies.

27. The apparatus of claim 17, wherein the at least one processor is further configured to:
receive an OAM transmission on a plurality of beams having a phase index of 0;
measure a reference signal received power (RSRP) for each of the plurality of beams having the phase index of 0; and
transmit a feedback message to the transmitter indicating the RSRP for each of the plurality of beams.

28. The apparatus of claim 27, wherein the at least one processor is further configured to:
receive the OAM transmission on a same beam during a sequence of consecutive symbols; and
test multiple beam hypotheses for the OAM transmission in different symbols.

29. The apparatus of claim 17, wherein the report indicates a strongest beam index in and indicates an angle θ relative to a center position.

30. A method of wireless communication at a receiver, comprising:
receiving, from a transmitter, a positive phase order orbital angular momentum (OAM) transmission on at least one beam;
receiving, from the transmitter, a negative phase order OAM transmission on the at least one beam;
transmitting, to the transmitter, a report indicating a relative phase difference between the positive phase order OAM transmission and the negative phase order OAM transmission; and
transmitting to the transmitter, a beam report indicating a strongest beam index m of the plurality of beams, wherein the strongest beam index m is based on channel quality,
wherein the positive phase order OAM transmission and the negative phase order OAM transmission are transmitted on a beam corresponding to the strongest beam index m.

* * * * *